US012720340B2

(12) United States Patent

Marzban et al.

(10) Patent No.: US 12,720,340 B2
(45) Date of Patent: Aug. 25, 2026

(54) CONFIGURING CONTROLLED CORRUPTED INFORMATION

(71) Applicant: QUALCOMM Incorporated, San Diego, CA (US)

(72) Inventors: Mohamed Fouad Ahmed Marzban, San Diego, CA (US); Sony Akkarakaran, Poway, CA (US); Wooseok Nam, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 519 days.

(21) Appl. No.: 18/058,065

(22) Filed: Nov. 22, 2022

(65) Prior Publication Data

US 2024/0172014 A1 May 23, 2024

(51) Int. Cl.

*H04W 24/08* (2009.01)
*H04W 24/04* (2009.01)
*H04W 24/10* (2009.01)
*H04W 72/23* (2023.01)

(52) U.S. Cl.

CPC ........... *H04W 24/08* (2013.01); *H04W 24/04* (2013.01); *H04W 24/10* (2013.01); *H04W 72/23* (2023.01)

(58) Field of Classification Search

CPC ..... H04W 24/08; H04W 24/02; H04W 72/23; H04W 24/10; H04W 24/04; H04W 12/10; H04W 24/06; H04W 16/22

See application file for complete search history.

(56) References Cited

U.S. PATENT DOCUMENTS

| | | | | |
|---|---|---|---|---|
| 2019/0132741 | A1* | 5/2019 | Stone | G06F 3/02 |
| 2020/0382929 | A1* | 12/2020 | Shi | G06N 3/063 |
| 2021/0399794 | A1* | 12/2021 | Arora | G06N 20/00 |
| 2022/0287104 | A1* | 9/2022 | Jeon | G06N 20/00 |
| 2024/0154709 | A1* | 5/2024 | Niu | H04W 24/02 |
| 2024/0211770 | A1* | 6/2024 | Chai | G06N 3/08 |

OTHER PUBLICATIONS

T. J. O'Shea, T. Roy and T. C. Clancy, "Over-the-Air Deep Learning Based Radio Signal Classification," in IEEE Journal of Selected Topics in Signal Processing, vol. 12, No. 1, pp. 168-179, Feb. 2018 (Year: 2018).*

* cited by examiner

*Primary Examiner* — Thomas R Cairns
*Assistant Examiner* — Raenita Ann Fenner
(74) *Attorney, Agent, or Firm* — Harrity & Harrity, LLP

(57) ABSTRACT

Various aspects of the present disclosure generally relate to wireless communication. In some aspects, a network node may transmit a corruption configuration indication that specifies a corruption parameter associated with generating controlled corrupted information. The network node may receive the controlled corrupted information that is based at least in part on the corruption parameter. Numerous other aspects are described.

30 Claims, 11 Drawing Sheets

UE
120

Network Node
110

610
Corruption Support indication

620
Corruption Configuration Indication

Generate controlled corrupted information
630

640
Controlled Corrupted Information

Train detection algorithm
650

660
Additional Information

Analyze the additional information
670

600

CONFIGURING CONTROLLED CORRUPTED INFORMATION

FIELD OF THE DISCLOSURE

Aspects of the present disclosure generally relate to wireless communication and to techniques and apparatuses for configuring controlled corrupted information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. “Downlink” (or “DL”) refers to a communication link from the network node to the UE, and “uplink” (or “UL”) refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include transmitting a corruption configuration indication that specifies a corruption parameter associated with generating controlled corrupted information. The method may include receiving the controlled corrupted information that is based at least in part on the corruption parameter.

Some aspects described herein relate to a method of wireless communication performed by a user equipment (UE). The method may include receiving a corruption configuration indication that specifies a corruption parameter associated with generating controlled corrupted information. The method may include transmitting the controlled corrupted information that is based at least in part on the corruption parameter.

Some aspects described herein relate to an apparatus for wireless communication at a network node. The apparatus may include a memory and one or more processors coupled to the memory. The one or more processors may be configured to transmit a corruption configuration indication that specifies a corruption parameter associated with generating controlled corrupted information. The one or more processors may be configured to receive the controlled corrupted information that is based at least in part on the corruption parameter.

Some aspects described herein relate to an apparatus for wireless communication at a UE. The apparatus may include a memory and one or more processors coupled to the memory. The one or more processors may be configured to receive a corruption configuration indication that specifies a corruption parameter associated with generating controlled corrupted information. The one or more processors may be configured to transmit the controlled corrupted information that is based at least in part on the corruption parameter.

Some aspects described herein relate to a non-transitory computer-readable medium that stores a set of instructions for wireless communication by a network node. The set of instructions, when executed by one or more processors of the network node, may cause the network node to transmit a corruption configuration indication that specifies a corruption parameter associated with generating controlled corrupted information. The set of instructions, when executed by one or more processors of the network node, may cause the network node to receive the controlled corrupted information that is based at least in part on the corruption parameter.

Some aspects described herein relate to a non-transitory computer-readable medium that stores a set of instructions for wireless communication by a UE. The set of instructions, when executed by one or more processors of the UE, may cause the UE to receive a corruption configuration indication that specifies a corruption parameter associated with generating controlled corrupted information. The set of instructions, when executed by one or more processors of the UE, may cause the UE to transmit the controlled corrupted information that is based at least in part on the corruption parameter.

Some aspects described herein relate to an apparatus for wireless communication. The apparatus may include means for transmitting a corruption configuration indication that specifies a corruption parameter associated with generating controlled corrupted information. The apparatus may include means for receiving the controlled corrupted information that is based at least in part on the corruption parameter.

Some aspects described herein relate to an apparatus for wireless communication. The apparatus may include means for receiving a corruption configuration indication that specifies a corruption parameter associated with generating controlled corrupted information. The apparatus may include means for transmitting the controlled corrupted information that is based at least in part on the corruption parameter.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
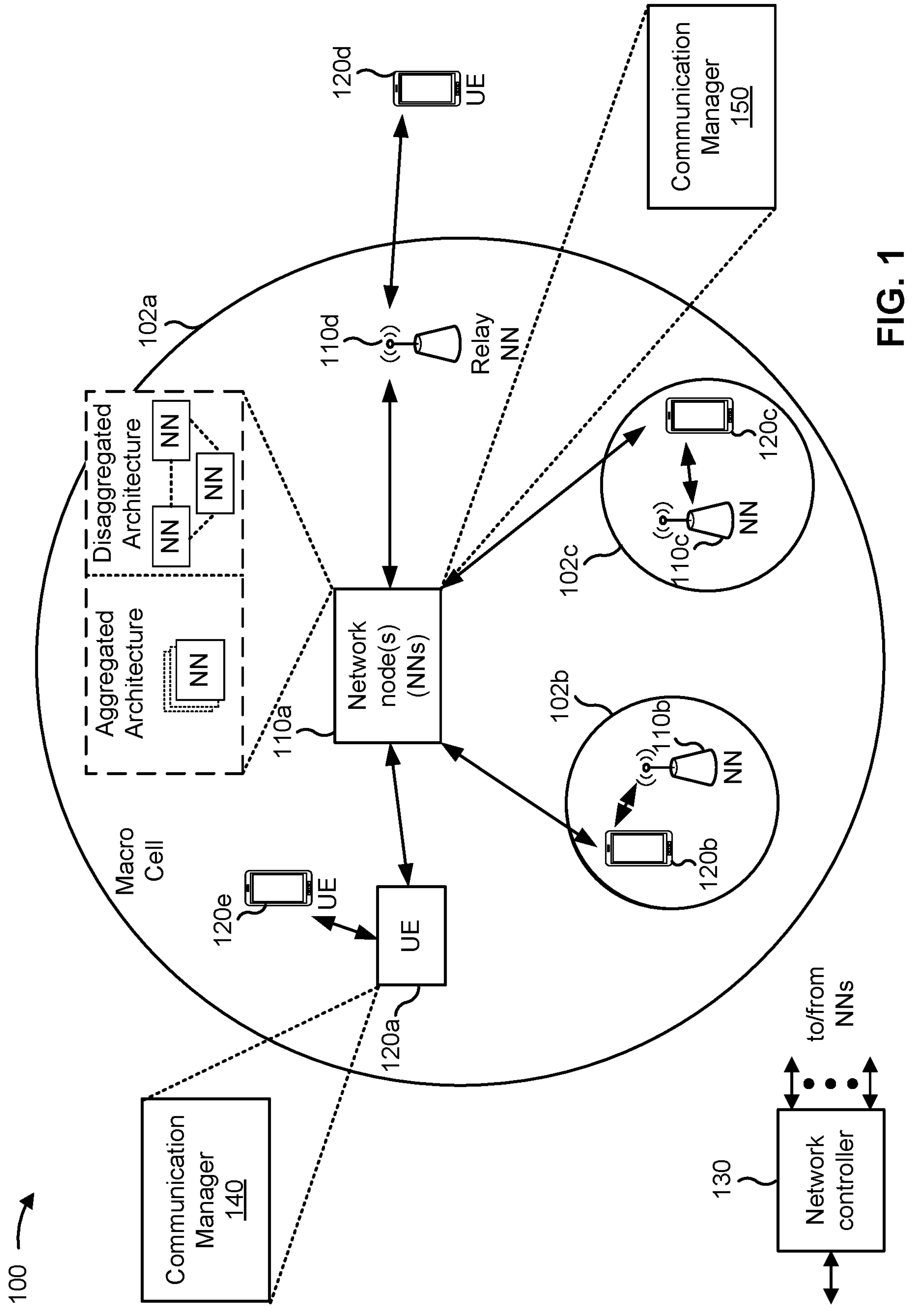
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the network node 110) may include a communication manager 150. As described in more detail elsewhere herein, the communication manager 150 may transmit a corruption configuration indication that specifies a corruption parameter associated with generating controlled corrupted information; and receive the controlled corrupted information that is based at least in part on the corruption parameter. Additionally, or alternatively, the communication manager 150 may perform one or more other operations described herein.

In some aspects, a UE (e.g., the UE 120) may include a communication manager 140. As described in more detail elsewhere herein, the communication manager 140 may receive a corruption configuration indication that specifies a corruption parameter associated with generating controlled corrupted information; and transmit the controlled corrupted information that is based at least in part on the corruption parameter. Additionally, or alternatively, the communication manager 140 may perform one or more other operations described herein.

As indicated above, FIG. 1 is provided as an example. Other examples may differ from what is described with regard to FIG. 1.

Figure 2:
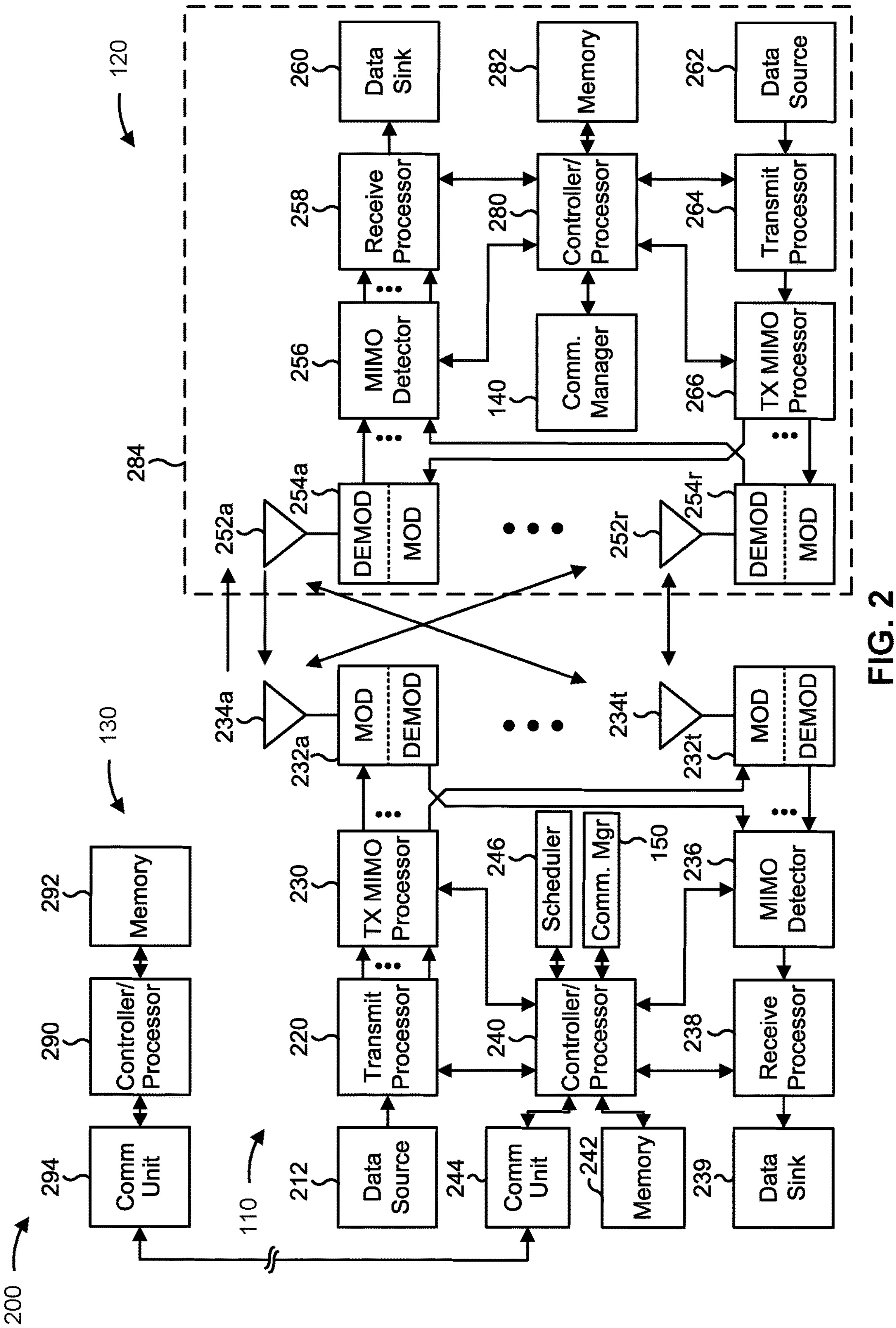
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-11).

The controller/processor 240 of the network node 110, the controller/processor 280 of the UE 120, and/or any other component(s) of FIG. 2 may perform one or more techniques associated with configuring controlled corrupted information, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node (e.g., the network node 110) includes means for transmitting a corruption configuration indication that specifies a corruption parameter associated with generating controlled corrupted information; and/or means for receiving the controlled corrupted information that is based at least in part on the corruption parameter. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for receiving a corruption configuration indication that specifies a corruption parameter associated with generating controlled corrupted information; and/or means for transmitting the controlled corrupted information that is based at least in part on the corruption parameter. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an JAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
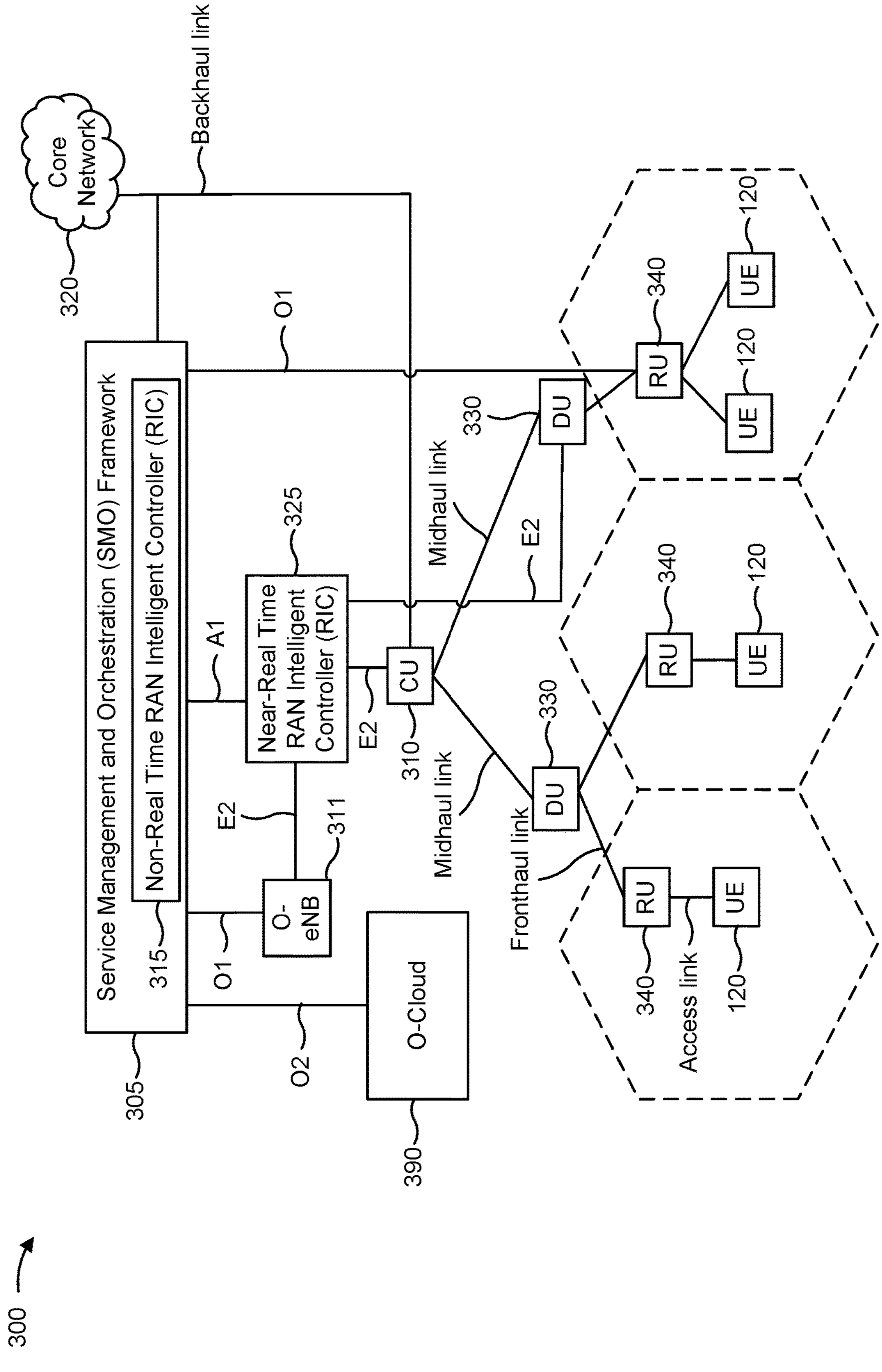
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
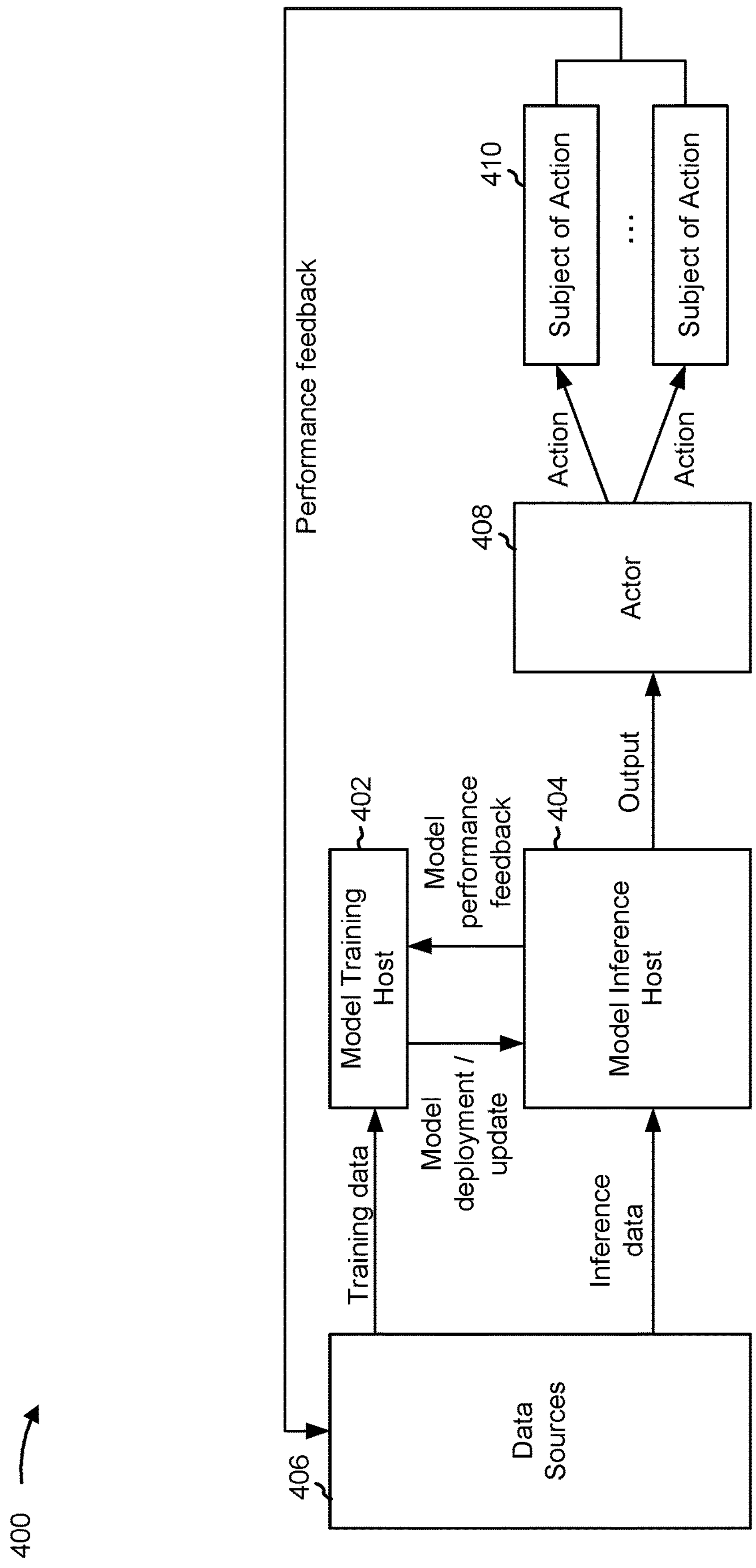
FIG. 4 is a diagram illustrating an example architecture of a functional framework for radio access network intelligence enabled by data collection, in accordance with the present disclosure.

FIG. 4 is a diagram illustrating an example architecture 400 of a functional framework for radio access network (RAN) intelligence enabled by data collection, in accordance with the present disclosure. In some scenarios, the functional framework for RAN intelligence may be enabled by further enhancement of data collection through use cases and/or examples. For example, principles or algorithms for RAN intelligence enabled by AI/ML and the associated functional framework (e.g., the AI functionality and/or the input/output of the component for AI enabled optimization) have been utilized or studied to identify the benefits of AI enabled RAN through possible use cases (e.g., beam management, energy saving, load balancing, mobility management, and/or coverage optimization, among other examples). In one example, as shown by the architecture 400, a functional framework for RAN intelligence may include multiple logical entities, such as a model training host 402, a model inference host 404, data sources 406, and an actor 408.

The model inference host 404 may be configured to run an AI/ML model based on inference data provided by the data sources 406, and the model inference host 404 may produce an output (e.g., a prediction) with the inference data input to the actor 408. The actor 408 may be an element or an entity of a core network or a RAN. For example, the actor 408 may be a UE, a network node, base station (e.g., a gNB), a CU, a DU, and/or an RU, among other examples. In addition, the actor 408 may also depend on the type of tasks performed by the model inference host 404, type of inference data provided to the model inference host 404, and/or type of output produced by the model inference host 404. For example, if the output from the model inference host 404 is associated with beam management, then the actor 408 may be a UE, a DU or an RU. In other examples, if the output from the model inference host 404 is associated with Tx/Rx scheduling, then the actor 408 may be a CU or a DU.

After the actor 408 receives an output from the model inference host 404, the actor 408 may determine whether to act based on the output. For example, if the actor 408 is a DU or an RU and the output from the model inference host 404 is associated with beam management, the actor 408 may determine whether to change/modify a Tx/Rx beam based on the output. If the actor 408 determines to act based on the output, the actor 408 may indicate the action to at least one subject of action 410. For example, if the actor 408 determines to change/modify a Tx/Rx beam for a communication between the actor 408 and the subject of action 410 (e.g., a UE 120), then the actor 408 may transmit a beam (re-)configuration or a beam switching indication to the subject of action 410. The actor 408 may modify its Tx/Rx beam based on the beam (re-)configuration, such as switching to a new Tx/Rx beam or applying different parameters for a Tx/Rx beam, among other examples. As another example, the actor 408 may be a UE and the output from the model inference host 404 may be associated with beam management. For example, the output may be one or more predicted measurement values for one or more beams. The actor 408 (e.g., a UE) may determine that a measurement report (e.g., a Layer 1 (L1) RSRP report) is to be transmitted to a network node 110.

The data sources 406 may also be configured for collecting data that is used as training data for training an ML model or as inference data for feeding an ML model inference operation. For example, the data sources 406 may collect data from one or more core network and/or RAN entities, which may include the subject of action 410, and provide the collected data to the model training host 402 for ML model training. For example, after a subject of action 410 (e.g., a UE 120) receives a beam configuration from the actor 408, the subject of action 410 may provide performance feedback associated with the beam configuration to the data sources 406, where the performance feedback may be used by the model training host 402 for monitoring or evaluating the ML model performance, such as whether the output (e.g., prediction) provided to the actor 408 is accurate. In some examples, if the output provided by the actor 408 is inaccurate (or the accuracy is below an accuracy threshold), then the model training host 402 may determine to modify or retrain the ML model used by the model inference host, such as via an ML model deployment/update.

As indicated above, FIG. 4 is provided as an example. Other examples may differ from what is described with regard to FIG. 4.

Figure 5B:
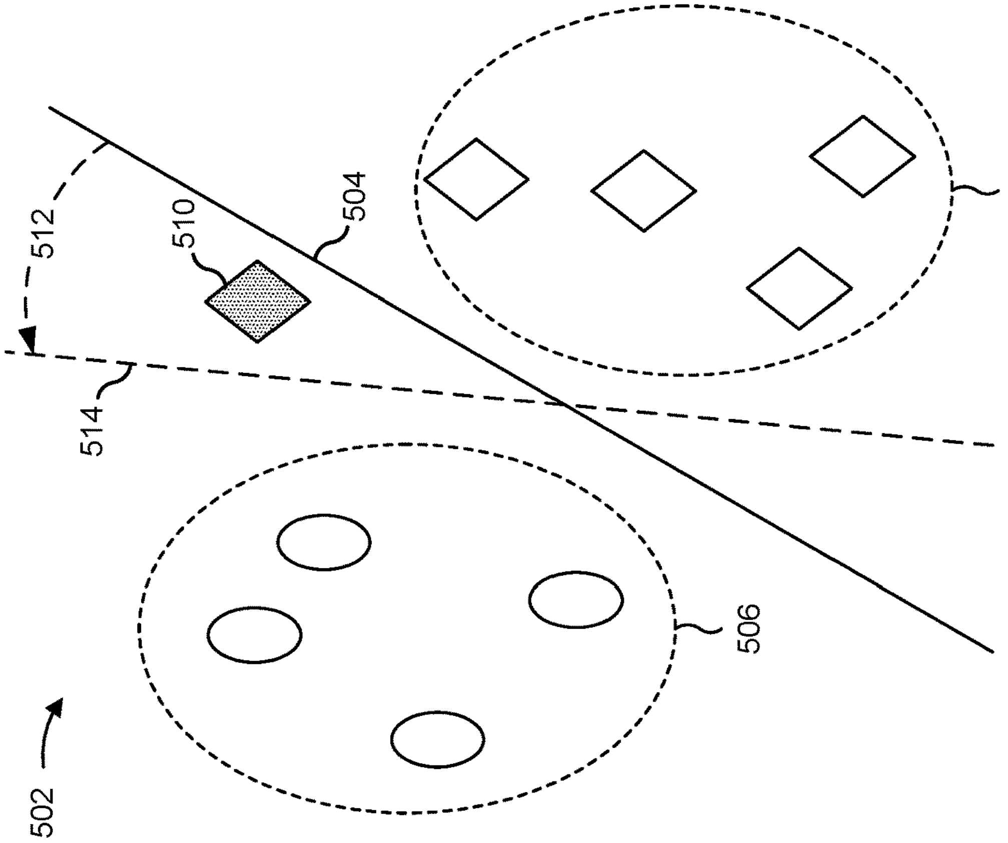
FIGS. 5A and 5B are diagrams illustrating a first example 500 and a second example 502 of corrupted information changing a machine learning (ML) model, in accordance with the present disclosure.
Figure 5A:
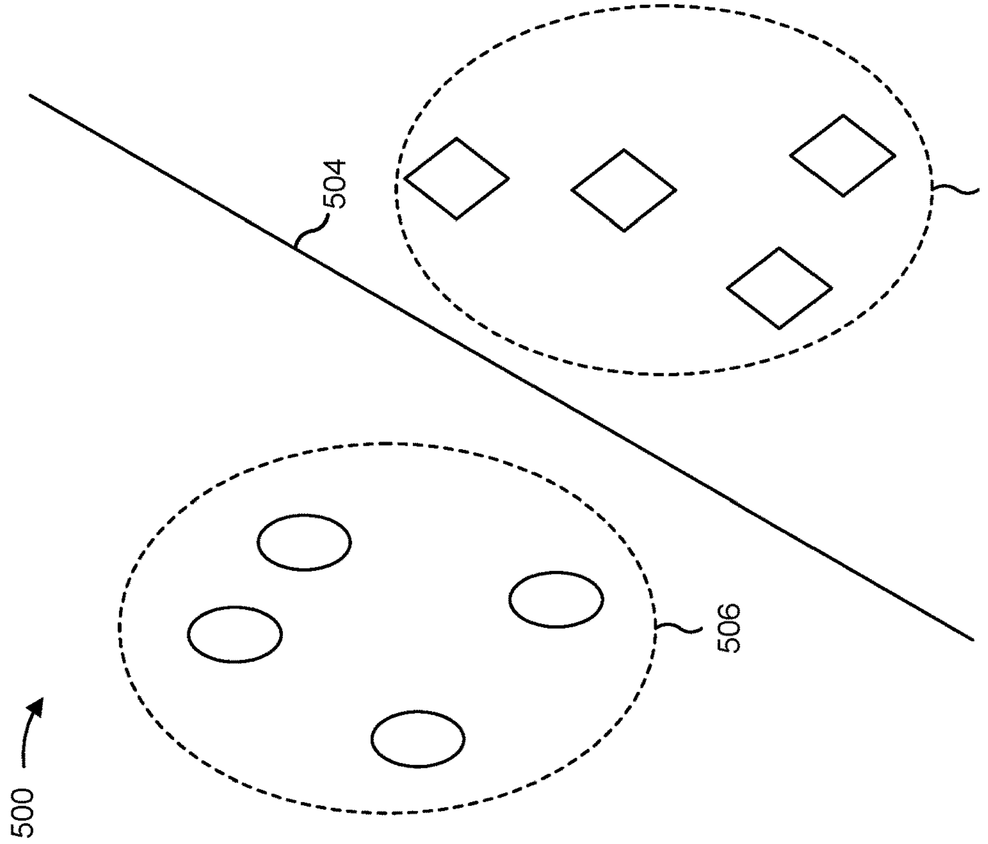

FIGS. 5A and 5B are diagrams illustrating a first example 500 and a second example 1502 of corrupted information changing an ML model, in accordance with the present disclosure.

"Machine learning model sensitivity" may denote a performance and/or accuracy of an ML model (e.g., an accuracy of the ML model correctly detecting and/or predicting an output). To illustrate, a first ML model with high sensitivity may have a higher true positive rate (TPR) relative to a second ML model with low sensitivity. That is, the second ML model with low sensitivity may detect more false positives (e.g., incorrect and/or inaccurate predictions) relative to the first ML model.

As described above, a model training host (e.g., the model training host 402) may determine to modify or retrain an ML model based at least in part on new input data. Differences and/or perturbations in the new input data relative to prior input data, such as a difference in a noise level and/or difference in a bias, may change the ML model and, subsequently, change an output and/or prediction generated by the ML model. An ML model (e.g., a complex ML model) configured with a decision space that is based at least in part on more parameters relative to a second ML model (e.g., a simple ML model) may be more susceptible to differences in input data used for training relative to the other (simple) ML model. That is, differences in input data from a first training to a second training of a complex ML model may result in decreased ML model sensitivity and/or increased false positives from the complex ML model.

The susceptibility of an ML model to differences in input data may result in a security vulnerability of the ML model.

To illustrate, a network node ML model may be trained to perform network management (e.g., beam management, energy saving, load balancing, mobility management, and/or coverage optimization). In some aspects, the network node may receive input data that is collected and/or generated by a UE, and the input data may be used by the model training host 402 to retrain and/or update the network node ML model. For example, the network node may transmit a reference signal, and a UE may collect and/or generate input data based at least in part on measuring the reference signal. To increase data diversity in input data used to train an ML model, the network node may collect data from multiple different UEs, forward the collected data to a core network, and/or forward the collected data to a second network node.

Corrupted information, such as a corrupted measurement result and/or an incorrect beam identifier, may change a sensitivity of an ML. As one example of corrupted information, an adversarial UE and/or a UE with malfunctioning hardware may introduce noise to a measured signal or a measurement result and/or select an incorrect beam identifier. The corrupted information may introduce error into a ML model (e.g., a network node ML model) based at least in part on a model training host using the corrupted information to retrain and/or modify the ML model. A To illustrate, and as shown by example 500 of FIG. 5A, a ML model may include a first decision boundary 504 that is used to classify input data as either a first data type 506 or a second data type 508. As one example, the decision boundary may be based at least in part on a threshold that is associated with a characteristic of the input data. Accordingly, the ML model may classify the input data as the first data type 506 or the second data type 508 based at least in part on how the characteristic of the input data compares to the decision boundary.

As shown by FIG. 5B, the ML model may receive, as training data, a corrupted input 510. For example, the corrupted input 510 may include a characteristic that (incorrectly) indicates that the corrupted input is the first data type 506 instead of the second data type 506. Accordingly, and as shown by reference number 512, the model training host may train the ML model with the corrupted input 510, resulting result in the ML model reconfiguring the first decision boundary 504 to a second decision boundary 514. For instance, and as shown by the example 502, a first threshold value associated with the first decision boundary 504 may be reconfigured and/or modified to a second threshold value. The reconfigured threshold value may result in a new decision boundary (e.g., the second decision boundary 514) that classifies the corrupted input 510 as the first data type 506. Thus, training with corrupted input information may cause an ML model (e.g., a network node ML model) to shift a decision boundary in a direction that results in more false positive detections by the ML model. Introducing error into an ML model (e.g., whether intentional or unintentional) may result in increased false positives and/or reduced ML model sensitivity. In a network management ML model, the increased false positives and/or reduced ML model sensitivity may increase errors in the network (e.g., errors in any combination of beam management, energy saving, load balancing, mobility management, and/or coverage optimization) that result in poor signal quality, reduced energy savings, increased data recovery errors, reduced data throughput, and/or increased data transfer latencies.

Some techniques and apparatuses described herein provide an ability for configuring controlled corrupted information. In some aspects, a network node may transmit a corruption configuration indication that specifies a corruption parameter associated with generating controlled corrupted information. For example, the network node may transmit the corruption configuration indication to a UE (e.g., a trusted UE) and indicate to generate controlled corrupted information based at least in part on the corruption parameter. The UE may receive the corruption configuration indication that specifies a corruption parameter associated with generating controlled corrupted information and transmit the controlled corrupted information (e.g., to the network node). For instance, the UE may generate the controlled corrupted information based at least in part on the corruption parameter, and the network node may receive the controlled corrupted information.

Based at least in part on controlling a configuration of corruption in information (e.g., by way of the corruption parameter), the network node may train a detection algorithm (e.g., an ML model) to detect additional corrupted information. To illustrate, a model training host at the network node may train a detection algorithm to detect corrupted information (e.g., from an adversarial UE or outlier corrupted information) based at least in part on using the controlled corrupted information as input and providing feedback in the training process. In some aspects, the network node may refrain from inputting the additional corrupted information to a network management algorithm (e.g., a ML model) and/or refrain from training the network management algorithm using the additional corrupted information based at least in part on the detection algorithm indicating that the additional corrupted information is corrupted.

A network node may instruct a trusted UE to corrupt information (e.g., a measurement result and/or returned data) according to a specific behavior. In some aspects, the network node may classify a UE as a "trusted UE" based at least in part on previous information (e.g., data and/or a measurement result) by this UE. To illustrate, and as described below, the network node may generate a trust score based at least in part on analyzing the information and assign the trust score to the UE. Based on the trust score, the network may classify the UE as a trusted UE. By controlling corrupted information and/or by configuring the controlled corrupted information, a network node may train a detection algorithm (e.g., a detection ML model) to identify uncontrolled corrupted information (e.g., from an adversarial UE or outlier information) and prevent the network node from training and/or modifying a network management algorithm with the uncontrolled corrupted information. Preventing the network node from retraining the network management algorithm using uncontrolled corrupted information may mitigate erroneous changes to the network management algorithm that reduce an ML sensitivity of the network management algorithm and/or increase false positives from the network management algorithm. Mitigating the erroneous changes may also improve signal quality, increase energy savings, reduce data recovery errors, increase data throughput, and/or decrease data transfer latencies.

As indicated above, FIGS. 5A and 5B are provided as an example. Other examples may differ from what is described with regard to FIGS. 5A and 5B.

Figure 6:
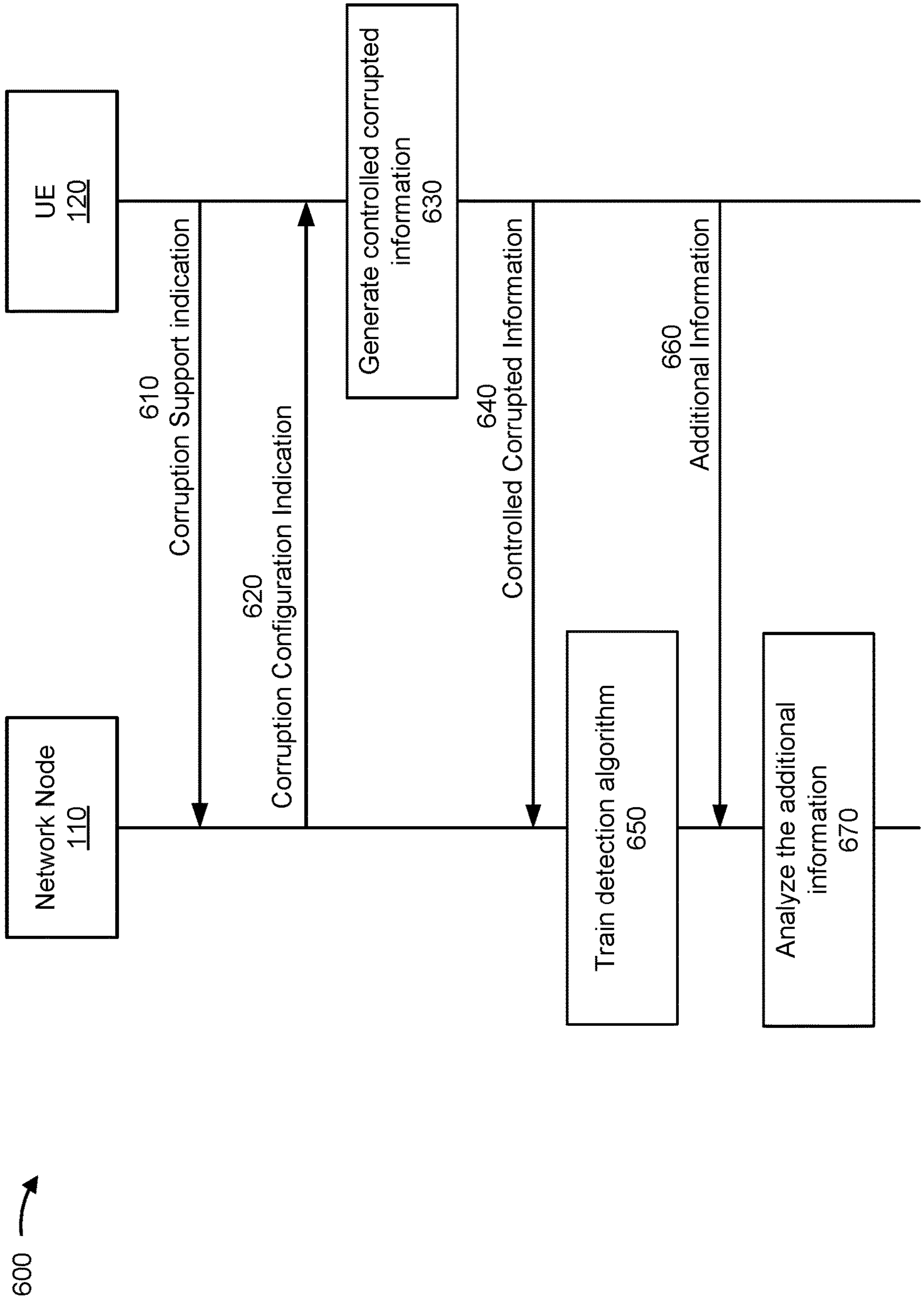
FIG. 6 is a diagram illustrating an example of a wireless communication process between a network node and a UE, in accordance with the present disclosure.

FIG. 6 is a diagram illustrating an example 600 of a wireless communication process between a network node (e.g., the network node 110) and a UE (e.g., the UE 120), in accordance with the present disclosure.

As shown by reference number 610, a UE 120 may transmit, and a network node 110 may receive, a corruption support indication. As one example, the UE may transmit the corruption support indication in UE capability information. That is, the UE may indicate, in the UE capability information, that the UE supports generating controlled corrupted information. The UE may transmit the corruption support indication using any combination of an RRC message, uplink control information (UCI), and/or a MAC control element (CE).

The corruption support indication may specify one or more corruption parameters supported by the UE. To illustrate, controlled corrupted information may be based at least in part on added noise and/or added bias to a measurement result and/or a signal that is used to generate the measurement result. In some aspects, the ULE may indicate, by way of the corruption support indication, that the UE supports adding noise corruption and/or bias corruption (e.g., for generating the controlled corrupted information). Alternatively or additionally, the UE may indicate a distribution function supported by the UE to configure the noise corruption and/or the bias corruption. As another example, the UE may indicate, by way of the corruption support indication, an ability to corrupt data, such as any combination of a data identifier (e.g., a beam identifier), a payload (e.g., an uplink transmission payload), and/or a radio frequency compliance data type (e.g., an error vector magnitude (EVM) metric and/or an adjacent channel leakage radio (ACLR) metric) associated with an uplink transmission by the UE. That is, the UE may indicate an ability to corrupt an uplink transmission in a manner that modifies an EVM metric and/or an ACLR metric.

As shown by reference number 620, the network node 110 may transmit, and the UE 120 may receive, a corruption configuration indication. In some aspects, the corruption configuration indication may include and/or indicate one or more corruption parameters, such as a noise corruption parameter, a bias corruption parameter, and/or a label corruption parameter. To illustrate, the noise corruption parameter and/or the bias corruption parameter may indicate a corruption distribution type to use for generating noise corruption and/or bias corruption that is included and/or used to generate controlled corrupted information (e.g., added to a measurement result value and/or a signal used to generate the measurement result), such as, by way of example and not of limitation, a Gaussian distribution type, a uniform distribution type, and/or an exponential distribution type. Alternatively or additionally, the corruption parameter may indicate a mean associated with the corruption distribution type and/or a variance associated with the corruption distribution type (e.g., a mean configuration and/or a variance configuration for generating the noise corruption and/or the bias corruption).

In some aspects, the corruption configuration indication may specify a measurement type associated with generating the controlled corrupted information. That is, the corruption configuration indication may specify to generate, as the controlled corrupted information, a corrupted measurement result and/or indicate a particular measurement type associated with the measurement result to corrupt, such as a channel measurement type, an interference measurement type, and/or a beam measurement type. To illustrate, the corruption configuration indication may specify, as the measurement type, an L1 channel state information (CSI) measurement, such as any combination of CQI, a precoding matrix indicator (PMI), a channel state information reference signal (CSI-RS) resource indicator (CRI), a layer indicator (LI), a rank indicator (RI), and/or an RSRP. Alternatively or additionally, the corruption configuration indication may specify, by way of example and not of limitation, an L1 signal-to-interference-plus-noise ratio (SINR) measurement, an L1 RSRP measurement, and/or an L1 RSRQ measurement as the measurement type. In some aspects, the corruption configuration indication may specify a positioning measurement as the measurement type, such as a reference signal time difference (RSTD) measurement, but other positioning measurements (e.g., measurements to determine a position) may be indicated.

The network node may select the measurement type to indicate in the corruption configuration indication based at least in part on a particular ML model. That is, the network node may determine to train a particular ML model and select a measurement type that may be used to train the particular ML model. To illustrate, a first ML model may perform interference and/or SINR prediction based at least in part on using an interference power measurement result and/or an SINR measurement result as input. Accordingly, the network node may select, as the measurement type, an interference power measurement and/or an SINR measurement to receive a corrupted interference measurement result and/or a corrupted SINR measurement result (e.g., to use as training input to the detection algorithm). As another example, a second ML model may perform beam prediction, and the network node may select an RSRP measurement type (e.g., for one or more beams) to receive a corrupted RSRP measurement result for training the detection algorithm.

Alternatively or additionally, the corruption configuration indication may specify and/or indicate a data type associated with generating the controlled corrupted information. For instance, the network node 110 may indicate to generate corrupted data as the controlled corrupted information and indicate a data type, such as a gradient update data type and/or an RF compliance data type that is associated with an uplink transmission. In some aspects, the gradient update data type may be based at least in part on federated learning in which a UE indicates updates to a local ML model (e.g., the gradient update) instead of training data used to train the local ML model. In specifying the gradient update data type, the corruption configuration indication may specify to generate a corrupted gradient update. The RF compliance data type may be based at least in part on the UE transmitting an uplink signal based at least in part on satisfying an RF compliance metric. For instance, the RF compliance data type may indicate an EVM compliance data type and/or an ACLR compliance data type. In specifying the RF compliance data type, the corruption configuration indication may specify to generate a corrupted transmission that does not satisfy the RF compliance metric.

In some aspects, a corruption parameter indicated by the corruption configuration indication may specify a data type that is associated with generating a corrupted uplink payload. For instance, the corruption parameter may indicate an uplink payload data type that specifies to corrupt a physical uplink control channel (PUCCH) payload and/or a physical uplink shared channel (PUSCH) payload.

A corruption parameter may indicate a corrupted label data type. For instance, the corrupted label data type may include a label flipping data type associated with generating a corrupted label and/or identifier (e.g., a beam identifier). That is, the corrupted label data type may indicate to select a different label and/or identifier, or to corrupt a bit pattern that indicates the label and/or identifier. The network node 110 may transmit the corruption configuration indication to the UE 120 based at least in part on receiving the UE capability information from the UE 120. For instance, the network node 110 may identify that the UE 120 supports a particular corruption parameter (e.g., a particular distribution type and/or a particular data type) that is associated with a training scenario, such as a Gaussian distribution type, an RF compliance metric data type, and/or a corrupted label data type. The network node may select the UE 120 to generate the controlled corrupted information based at least in part on the UE 120 supporting the particular corruption parameter.

The corruption configuration indication may specify and/or indicate a condition associated with generating the controlled corrupted information. That is, the corruption configuration indication may specify to generate the controlled corrupted information when a condition has been satisfied. Some example conditions may include a particular beam occurrence, a transmission configuration indicator (TCI) state occurrence, an MCS occurrence, a rank occurrence, and/or a measurement result satisfying a threshold. Accordingly, the corruption configuration indication may specify to generate the controlled corrupted information based at least in part on detecting that the particular beam has been received, a particular transmission is based at least in part on the MCS, and/or a generated measurement result satisfies the threshold. Alternately or additionally, the corruption configuration indication may indicate to refrain from generating the controlled corrupted information when the condition has not been satisfied.

As shown by reference number 630, the UE 120 may generate controlled corrupted information. The UE 120 may generate the controlled corrupted information based at least in part on one or more corruption parameters indicated by the corruption configuration indication, such as by adding noise corruption and/or bias corruption to a measurement result and/or to a signal that is being measured based at least in part on a distribution type, a mean, and/or variance specified by the controlled corrupted information. As another example, the UE 120 may change a label and or identifier of a selected beam. In some aspects, the UE 120 may corrupt a payload of a PUCCH transmission and/or a payload of a PUSCH transmission. Alternatively or additionally, the UE 120 may alter a transmission configuration for an uplink transmission such that the uplink transmission (intentionally) fails an RF compliance metric.

The UE may, at times, refrain from generating the controlled corrupted information based at least in part on a condition specified by the corruption configuration indication not being satisfied. Alternatively or additionally, the UE 120 may generate the controlled corrupted information based at least in part on detecting that the condition has been satisfied (e.g., that a particular beam has been received, a particular TCI state has occurred, a signal associated with a particular rank has been received, and/or a measurement result has satisfied a threshold).

As shown by reference number 640, the UE 120 may transmit, and the network node 110 may receive, controlled corrupted information. As described above, the controlled corrupted information may include a corrupted measurement result, corrupted data, and/or a corrupted transmission. For example, the UE 120 may transmit a sounding reference signal (SRS) transmission based at least in part on using a transmission configuration that results in an RF compliance metric that fails to satisfy a compliance threshold, such as a transmission configuration that results in the SRS transmission having a higher ACLR and/or EVM (e.g., relative to a compliant ACLR and/or a compliant EVM). As another example, the UE 120 may transmit a PUCCH that includes a (controlled) corrupted payload and/or a PUSCH that includes a (controlled) corrupted payload. Alternatively or additionally, the UE 120 may transmit a corrupted measurement result that is based at least in part on added noise and/or added bias (e.g., in the measurement result value and/or a signal used to generate the measurement result), a corrupted identifier (e.g., an intentionally incorrect identifier and/or label), and/or a corrupted gradient update (e.g., an intentionally incorrect gradient value).

As shown by reference number 650, the network node 110 may train a detection algorithm to detect additional corrupted information based at least in part on the controlled corrupted information. For instance, as described with regard to FIG. 4, a model training host 402 may train a detection algorithm (e.g., a detection ML model) to identify corrupted information based at least in part on using the controlled corrupted information as input and/or by providing feedback to the detection algorithm. In some aspects, and as described with regard to FIG. 7, the network node 110 may forward the controlled corrupted information and/or a gradient update to a second network node. Alternatively or additionally, the network node 110 may receive additional controlled corrupted information from the second network node. In some aspects, the network node 110 may train the detection algorithm based at least in part on the additional controlled corrupted information from the second network.

The detection algorithm may be based at least in part on an ML model (e.g., an algorithm that includes dynamic and/or changing logic) and/or a static algorithm (e.g., an algorithm with static logic). To illustrate, an ML model may be trained to identify corrupted information and/or trained to perform a data corruption detection scheme. As one example of a data corruption detection scheme, the detection algorithm may be based at least in part on a reject on negative impact (RONI) detection scheme that evaluates an effect that input data has on an ML model during training. Based at least in part on identifying input data that results in a negative impact on an ML sensitivity and/or accuracy (e.g., reduces an ML sensitivity), the detection algorithm may remove and/or eliminate the input data as training data (e.g., for a network management algorithm). Alternatively or additionally, the detection algorithm may be based at least in part on a divergence calculation as described below. In some aspects, the network node 110 may generate a trust score associated with input data (e.g., controlled corrupted information) based at least in part on the detection algorithm. The trust score may be based at least in part on a RONI detection scheme that indicates a performance of an algorithm processing the input data information, such as a performance associated with ML sensitivity (e.g., first input information and/or data that reduces ML sensitivity may be assigned a lower trust score relative to second input information and/or data that increases ML sensitivity).

In some aspects, the network node may determine whether to use information to train a network management algorithm based at least in part on a trust score associated with the information. To illustrate, first information (e.g., a measurement result and/or data) that is associated with a high trust score (e.g., that satisfies a trust threshold) may be used to train the network management algorithm management algorithm based at least in part on the trust score indicating that the information is less likely to be corrupted. Second information that is associated with a low trust score (e.g., that fails to satisfy the trust threshold) may be discarded by the network node 110 and/or omitted as training information. The network node 110 may maintain multiple detection algorithms, and each detection algorithm may be associated with a particular and/or respective data set. To illustrate, a first detection algorithm may be trained to detect corrupted RSRP input data, a second detection algorithm may be trained to detect a corrupted beam identity, and/or a third detection algorithm may be trained to detect a corrupted radio frequency compliance metric.

As shown by reference number 660, the UE 120 may transmit, and the network node 110 may receive, additional information. For example, the UE 120 may transmit an additional measurement result, an additional uplink payload, and/or an additional uplink transmission. Accordingly, the additional information may be any type of information used by the network node 110 as input to a network management algorithm and/or as input to a detection algorithm as described above. While the example 600 shows a same UE transmitting the controlled corrupted information and the additional information, other examples may include different UEs transmitting the controlled corrupted information and the additional information.

As shown by reference number 670, the network node 110 may analyze the additional information. In some aspects, the network node 110 may analyze whether the additional information is corrupted information based at least in part on the detection algorithm. For example, the detection algorithm may perform a comparison of the additional information to controlled corrupted information, such as by generating a distribution similarity metric that indicates a similarity between a first distribution that is associated with the controlled corrupted information and a second distribution that is associated with the additional information. To illustrate, for prediction of an interference power measurement result, an ML model (e.g., a network management ML algorithm) may use one or more interference power measurement results associated with prior air interface resources to predict a future interference power measurement result associated with a future air interface resource. Accordingly, the (prior) interference power measurement result(s) may be used as input information to the ML model and the predicted interference power measurement result(s) may be generated as an output. In some aspects, a distribution similarity metric generated by the detection algorithm may be based at least in part on a joint distribution between the input information (e.g., the prior interference power measurement result(s)) and the output information (e.g., the predicted interference power measurement result(s)). For example, the detection algorithm may generate the joint distribution based at least in part on a difference between one or more measured (prior) interference power measurement result(s) and one or more predicted interference power measurement result(s).

The detection algorithm may generate the distribution similarity metric based at least in part on comparing the first distribution (e.g., a property of the first distribution) to the second distribution (e.g., a same property of the second distribution) and/or determine whether the additional information is corrupted based at least in part on the distribution similarity metric. In some aspects, the distribution similarity metric may indicate that the additional information is corrupted based at least in part on a difference between the first distribution and the second distribution satisfying a corruption threshold, and/or may indicate that the additional information is not corrupted based at least in part on the difference failing to satisfy the corruption threshold.

A distribution may be based at least in part on one or more statistical properties, such as a spread statistical property (e.g., an amount of variation between small values of the distribution and large values of the distribution), a mean statistical property (e.g., an average and/or expected value), and/or a shape statistical property (e.g., a shape that the distribution follows around a point or location). In some aspects, the detection algorithm may compare a first statistical property associated with the first distribution to a second (same) statistical property associated with the second distribution to generate a distribution similarity metric. Alternatively or additionally, the detection algorithm may compare multiple (e.g., two or more) distribution statistical properties of the first distribution that is associated with controlled corrupted information with multiple (same) distribution statistical properties of the second distribution that is associated with the additional information. For instance, the detection algorithm may compare, as the multiple distribution statistical properties, any combination of a distribution mean, a distribution variance, a distribution covariance, a k-th order moment (where k is an integer), a 5-th percentile, and/or 95-th percentile of the input information-output information distributions. Accordingly, a distribution similarity metric may be based at least in part on multiple distribution statistical properties.

In some aspects, the detection algorithm may generate the distribution similarity metric based at least in part on divergence between the first distribution and the second distribution. As one non-limiting example, the detection algorithm may calculate a statistical distance (e.g., that indicates the distribution similarity) between the two distributions based at least in part on calculating a Kolmogorov-Smirnov (KS) distance and/or by calculating an earth-movers distance (e.g., a statistical distance between two distributions over a same region). The earth-movers distance may also be referred to as a Wasserstein metric. As another example, the detection algorithm may calculate, as the distribution similarity metric, an informational divergence between the two distributions based at least in part on calculating a Kullback-Leibler divergence.

The ability to generate controlled corrupted information enables a network node 110 to test and/or train a detection algorithm to identify corrupted information and mitigate training and/or modifying an ML model (e.g., a network management algorithm) with the corrupted information. Preventing the network node from retraining a network management algorithm using uncontrolled corrupted information may improve a security of the network management algorithm model by mitigating (false) changes that reduce an ML sensitivity of the network management algorithm and/or increase false positives from the network management algorithm. Mitigating the (false) changes may also improve signal quality, increase energy savings, reduce data recovery errors, increase data throughput, and/or decrease data transfer latencies.

As indicated above, FIG. 6 is provided as an example. Other examples may differ from what is described with regard to FIG. 6.

Figure 7:
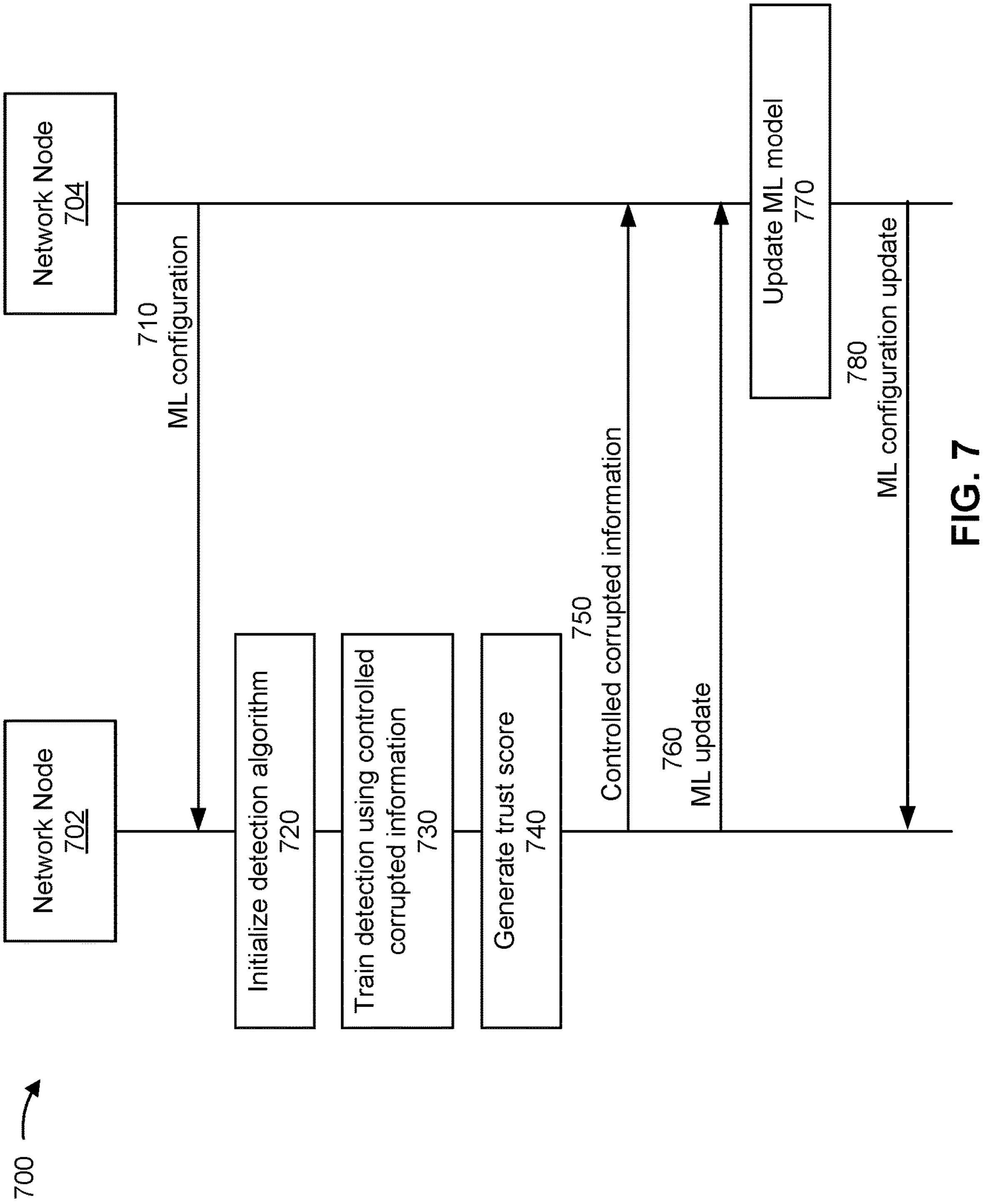
FIG. 7 is a diagram illustrating an example of a wireless communication process between a first network node and a second network node, in accordance with the present disclosure.

FIG. 7 is a diagram illustrating an example 700 of a wireless communication process between a first network node 702 (e.g., a first network node 110) and a second network node 704 (e.g., a second network node 110), in accordance with the present disclosure. In some examples, the second network node 704 may be a core network node, but may be a different type of network node as described with regard to FIGS. 1 and 3 in other examples.

As shown by reference number 710, a second network node 704 may communicate an ML configuration to a first network node 702. As one example, the second network node 704 may be a core network node that manages federated learning for a network management algorithm (e.g., a network management ML model) and/or a detection algorithm (e.g., a detection ML model). The core network node may communicate a baseline ML configuration (e.g., a number of processing layers, a number of connected processing nodes, and/or a coefficient associated with a processing node) to the first network node 702 as an initial configuration for the network management algorithm and/or detection algorithm. In some aspects, and as described with regard to reference number 780, the core network node may send an update to the ML configuration (e.g., for the network management algorithm and/or the detection algorithm) based at least in part on receiving gradient updates from other network nodes. The second network node 704 may communicate the ML configuration to the first network node 702 using a backhaul link, which may be a wired link or a wireless link. While the example 700 shows the second network node 704 communicating the ML configuration to the first network node 702, other examples may exclude the second network node 704 communicating an ML configuration to the first network node 702.

As shown by reference number 720, the first network node 702 may initialize a detection algorithm. In some aspects, the detection algorithm may be based at least in part on an ML model and/or may be based at least in part on an ML configuration indicated by the second network node 704. However, in other examples, the detection algorithm may not be implemented as an ML model and/or the first network node 702 may initialize the detection algorithm without receiving an ML configuration from the second network node 704.

As shown by reference number 730, the first network node 702 may train the detection algorithm as described with regard to reference number 650 of FIG. 6. To illustrate, the first network node 702 may receive controlled corrupted information from a UE as described with regard to reference number 620, reference number 630, and/or reference number 640 of FIG. 6, and train the detection algorithm based at least in part on using the controlled corrupted information. Alternatively or additionally, the first network node 702 may receive additional controlled corrupted information from the second network node 704 (e.g., as a core network node or as another network node), and train the detection algorithm based at least in part on the additional controlled corrupted information.

As shown by reference number 740, the first network node 702 may generate a trust score for the controlled corrupted information. To illustrate, as described with regard to FIG. 6, the first network node 702 may generate the trust score based at least in part on a RONI detection scheme (e.g., implemented by the detection algorithm).

As shown by reference number 750, the first network node 702 may communicate the controlled corrupted information to the second network node 704. To illustrate, the first network node 702 may communicate and/or forward the controlled corrupted information to the second network node 704 using a backhaul link, which may be a wired link or a wireless link. In some aspects, the first network node 702 may indicate, to the second network node, a trust score that is associated with the controlled corrupted information.

As shown by reference number 760, the first network node 702 may communicate an ML update to the second network node 704. For instance, the first network node 702 may indicate, based at least in part on federated learning, a gradient update associated with the detection algorithm (and/or a network management algorithm). To preserve security of data at the first network node 702, the first network node 702 may refrain from transmitting the controlled corrupted information and/or the trust score to the second network node 704 and, instead, transmit the gradient update.

As shown by reference number 770, the second network node 704 may update an ML model. To illustrate, the second network node 704 may be implemented as a core network node, as described with regard to reference number 710, that manages an ML model and/or deploys updates to the ML model based at least in part on federated learning and/or updates from one or more network nodes associated with using the ML model. The second network node 704 may update a common ML model (e.g., for a detection algorithm and/or a network management model) based at least in part on the gradient update from the first network node 702 and/or an additional gradient update from another network node.

As shown by reference number 780, the second network node 704 may communicate an ML configuration update to the first network node 702. To illustrate, the second network node 704 may communicate an ML configuration update for a detection algorithm and/or a network management algorithm based at least in part on the ML update from the first network node 702 and as described with regard to reference number 760.

As indicated above, FIG. 7 is provided as an example. Other examples may differ from what is described with regard to FIG. 7.

Figure 8:
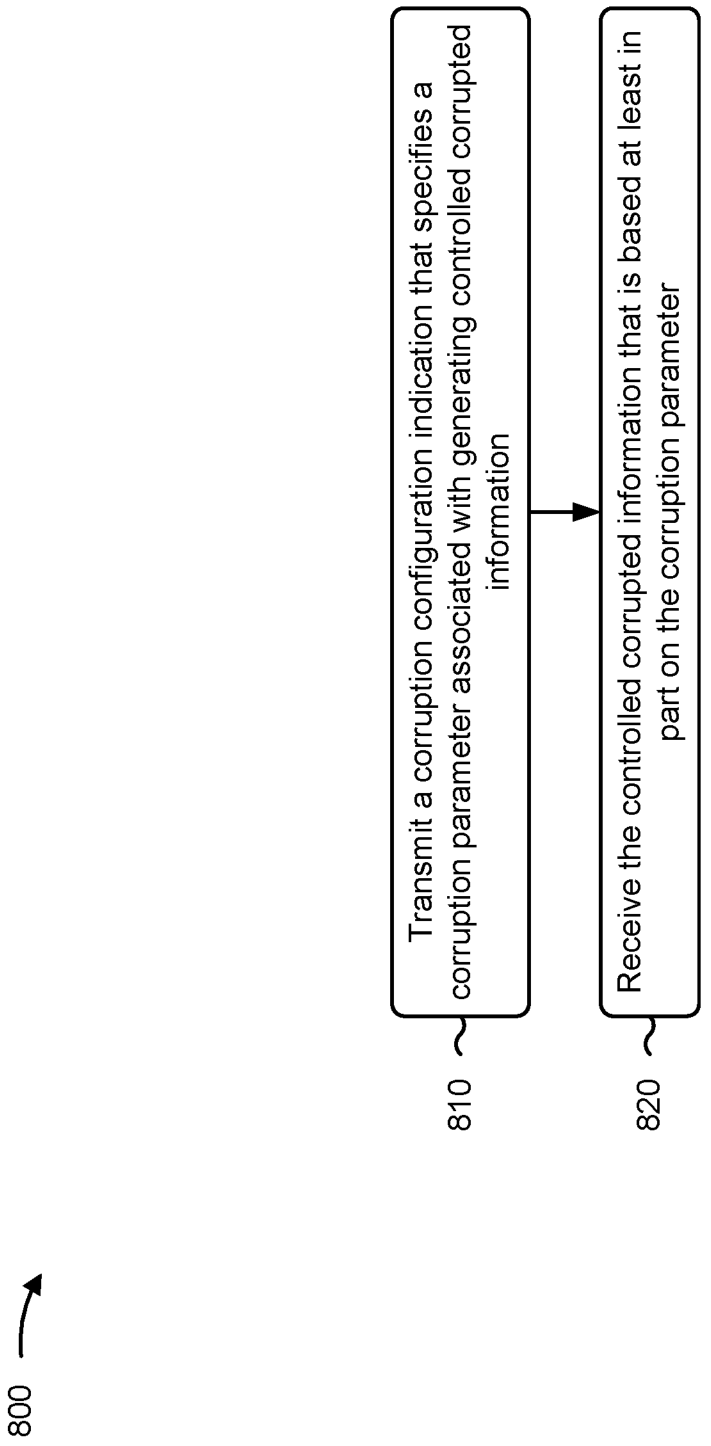
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with configuring controlled corrupted information.

As shown in FIG. 8, in some aspects, process 800 may include transmitting a corruption configuration indication that specifies a corruption parameter associated with generating controlled corrupted information (block 810). For example, the network node (e.g., using communication manager 150 and/or transmission component 1004, depicted in FIG. 10) may transmit a corruption configuration indication that specifies a corruption parameter associated with generating controlled corrupted information, as described above.

As further shown in FIG. 8, in some aspects, process 800 may include receiving the controlled corrupted information that is based at least in part on the corruption parameter (block 820). For example, the network node (e.g., using communication manager 150 and/or reception component 1002, depicted in FIG. 10) may receive the controlled corrupted information that is based at least in part on the corruption parameter, as described above.

Process 800 may include additional aspects, such as any single aspect or any combination of aspects described below and/or in connection with one or more other processes described elsewhere herein.

In a first aspect, process 800 includes training a detection algorithm to detect additional corrupted information based at least in part on the controlled corrupted information.

In a second aspect, process 800 includes refraining from inputting the additional corrupted information to a network management algorithm based at least in part on the detection algorithm indicating that the additional corrupted information is corrupted.

In a third aspect, the corruption parameter includes at least one of a noise corruption parameter, a bias corruption parameter, or a label corruption parameter.

In a fourth aspect, the corruption parameter indicates a corruption distribution type associated with generating the controlled corrupted information.

In a fifth aspect, the corruption parameter indicates at least one of a distribution type associated with the corruption distribution type, a mean associated with the corruption distribution type, or a variance associated with the corruption distribution type.

In a sixth aspect, the corruption distribution type includes a Gaussian distribution type, a uniform distribution type, or an exponential distribution type.

In a seventh aspect, the controlled corrupted information includes a corrupted measurement result, and the corruption configuration indication specifies a measurement type associated with the corrupted measurement result.

In an eighth aspect, the measurement type indicates at least one of a channel measurement type, an interference measurement type, or a beam measurement type.

In a ninth aspect, the measurement type indicates at least one of an L1 channel state information measurement, an L1 signal-to-interference-plus-noise ratio measurement, an L1 reference signal received power measurement, or an L1 reference signal received quality measurement.

In a tenth aspect, the measurement type indicates a positioning measurement.

In an eleventh aspect, the positioning measurement includes a reference signal time difference measurement.

In a twelfth aspect, process 800 includes selecting the measurement type based at least in part on a particular machine learning model.

In a thirteenth aspect, the controlled corrupted information includes corrupted data, and the corruption configuration indication indicates a data type associated with the corrupted data.

In a fourteenth aspect, the data type includes a gradient update associated with federated learning.

In a fifteenth aspect, the data type includes a radio frequency compliance data type that is associated with an uplink transmission.

In a sixteenth aspect, the uplink transmission includes a sounding reference signal transmission.

In a seventeenth aspect, the radio frequency compliance data type includes at least one of an EVM radio frequency compliance data type, or an ACLR radio frequency compliance data type.

In an eighteenth aspect, the data type includes an uplink payload.

In a nineteenth aspect, the uplink payload includes at least one of a PUCCH payload, or a PUSCH payload.

In a twentieth aspect, the corruption configuration indication specifies a condition associated with generating the controlled corrupted information.

In a twenty-first aspect, the condition includes at least one of a particular beam occurrence, a transmission configuration indicator state occurrence, a modulation and coding scheme occurrence, a rank occurrence, or a measurement result satisfying a threshold.

In a twenty-second aspect, process 800 includes receiving UE capability information that indicates a UE includes an ability to generate the controlled corrupted information, and transmitting the corruption configuration indication includes transmitting the corruption configuration indication to the UE based at least in part on receiving the UE capability information.

In a twenty-third aspect, the UE capability information indicates a corruption distribution type supported by the UE, and transmitting the corruption configuration indication includes transmitting the corruption configuration indication to the UE based at least in part on the corruption distribution type supported by the UE.

In a twenty-fourth aspect, process 800 includes forwarding the controlled corrupted information to a second network node.

In a twenty-fifth aspect, process 800 includes applying a trust score to the controlled corrupted information, and forwarding the trust score with the controlled corrupted information to the second network node.

In a twenty-sixth aspect, process 800 includes generating the trust score based at least in part on a performance of a detection algorithm in processing the controlled corrupted information.

In a twenty-seventh aspect, the performance of the detection algorithm is based at least in part on a reject on negative impact defense.

In a twenty-eighth aspect, the second network node is a core network node, and process 800 includes receiving, from the core network node, an update to a detection algorithm that is configured to detect corrupted information, and updating the detection algorithm based at least in part on the update.

In a twenty-ninth aspect, process 800 includes training a detection algorithm to detect additional corrupted information based at least in part on the controlled corrupted information, and forwarding, based at least in part on federated learning, an update to the detection algorithm to a core network.

In a thirtieth aspect, process 800 includes receiving, from a second network node, additional controlled corrupted information, and training a detection algorithm based at least in part on the controlled corrupted information and the additional controlled corrupted information.

In a thirty-first aspect, the second network node is a core network node.

In a thirty-second aspect, process 800 includes receiving additional information, generating a distribution similarity metric based at least in part on a first distribution associated with the controlled corrupted information and a second distribution associated with the additional information, and determining whether the additional information is corrupted based at least in part on the distribution similarity metric.

In a thirty-third aspect, generating the distribution similarity metric is based at least in part on a first distribution statistical property that is associated with the controlled corrupted information, and a second distribution statistical property that is associated with the additional information.

In a thirty-fourth aspect, generating the distribution similarity metric is based at least in part on a combination of at least two distribution statistical properties that are associated with the controlled corrupted information, and at least two distribution statistical properties associated with the additional information.

In a thirty-fifth aspect, generating the distribution similarity metric is based at least in part on a divergence between the first distribution associated with the controlled corrupted information and the second distribution associated with the additional information.

In a thirty-sixth aspect, process 800 includes calculating the divergence based at least in part on Kullback-Leibler divergence.

In a thirty-seventh aspect, generating the distribution similarity metric includes calculating a distribution distance between the additional information and the controlled corrupted information.

In a thirty-eighth aspect, calculating the distribution distance is based at least in part on calculating at least one of a Kolmogorov-Smirnov distance, or an earth-movers distance.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
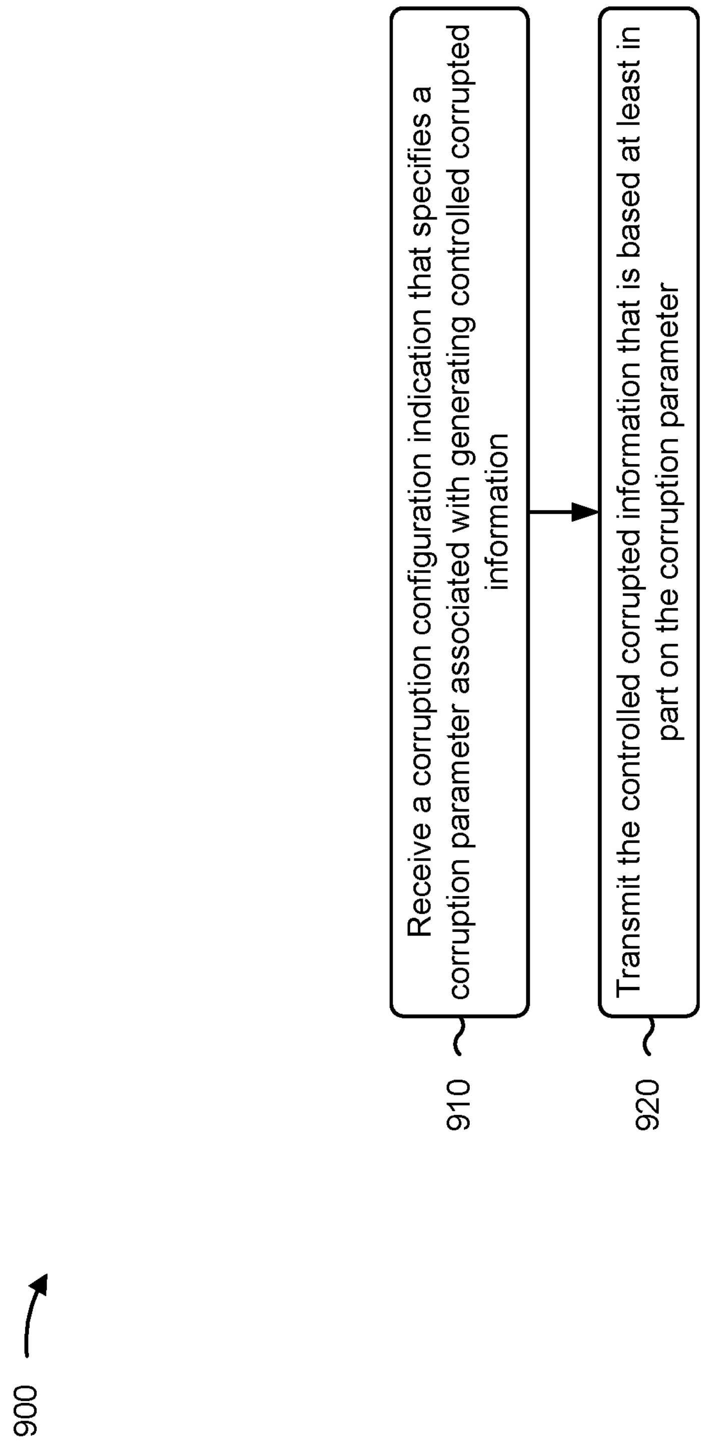
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with configuring controlled corrupted information.

As shown in FIG. 9, in some aspects, process 900 may include receiving a corruption configuration indication that specifies a corruption parameter associated with generating controlled corrupted information (block 910). For example, the UE (e.g., using communication manager 140 and/or reception component 1102, depicted in FIG. 11) may receive a corruption configuration indication that specifies a corruption parameter associated with generating controlled corrupted information, as described above.

As further shown in FIG. 9, in some aspects, process 900 may include transmitting the controlled corrupted information that is based at least in part on the corruption parameter (block 920). For example, the UE (e.g., using communication manager 140 and/or transmission component 1104, depicted in FIG. 11) may transmit the controlled corrupted information that is based at least in part on the corruption parameter, as described above.

Process 900 may include additional aspects, such as any single aspect or any combination of aspects described below and/or in connection with one or more other processes described elsewhere herein.

In a first aspect, the corruption parameter includes at least one of a noise corruption parameter, a bias corruption parameter, or a label corruption parameter.

In a second aspect, the corruption parameter indicates a corruption distribution type associated with generating the controlled corrupted information.

In a third aspect, the corruption parameter indicates at least one of a distribution type associated with the corruption distribution type, a mean associated with the corruption distribution type, or a variance associated with the corruption distribution type.

In a fourth aspect, the corruption distribution type includes a Gaussian distribution type, a uniform distribution type, or an exponential distribution type.

In a fifth aspect, the controlled corrupted information includes a corrupted measurement result, and the corruption configuration indication specifies a measurement type associated with the corrupted measurement result.

In a sixth aspect, process 900 includes generating, as the controlled corrupted information, the corrupted measurement result.

In a seventh aspect, the measurement type indicates at least one of a channel measurement type, an interference measurement type, or a beam measurement type.

In an eighth aspect, the measurement type indicates at least one of an L1 channel state information measurement, an L1 signal-to-interference-plus-noise ratio measurement, an L1 reference signal received power measurement, or an L1 reference signal received quality measurement.

In a ninth aspect, the measurement type indicates a positioning measurement.

In a tenth aspect, the positioning measurement includes a reference signal time difference measurement.

In an eleventh aspect, the controlled corrupted information includes corrupted data, and the corruption configuration indication indicates a data type associated with the corrupted data.

In a twelfth aspect, process 900 includes generating, as the controlled corrupted information, the corrupted data.

In a thirteenth aspect, the data type includes a gradient update associated with federated learning.

In a fourteenth aspect, the data type includes a radio frequency compliance data type that is associated with an uplink transmission.

In a fifteenth aspect, the uplink transmission includes a sounding reference signal transmission.

In a sixteenth aspect, the radio frequency compliance data type includes at least one of an EVM radio frequency compliance data type, or an ACLR radio frequency compliance data type.

In a seventeenth aspect, the data type includes an uplink payload.

In an eighteenth aspect, the uplink payload includes at least one of a PUCCH payload, or a PUSCH payload.

In a nineteenth aspect, the corruption configuration indication specifies a condition associated with generating the controlled corrupted information.

In a twentieth aspect, the condition includes at least one of a particular beam occurrence, a transmission configuration indicator state occurrence, a modulation and coding scheme occurrence, a rank occurrence, or a measurement result satisfying a threshold.

In a twenty-first aspect, process 900 includes transmitting UE capability information that indicates that the UE includes an ability to generate the controlled corrupted information, and receiving the corruption configuration indication includes receiving the corruption configuration indication to the UE based at least in part on transmitting the UE capability information.

In a twenty-second aspect, the UE capability information indicates a corruption distribution type supported by the UE, and receiving the corruption configuration indication includes receiving the corruption configuration indication to the UE based at least in part on the corruption distribution type supported by the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
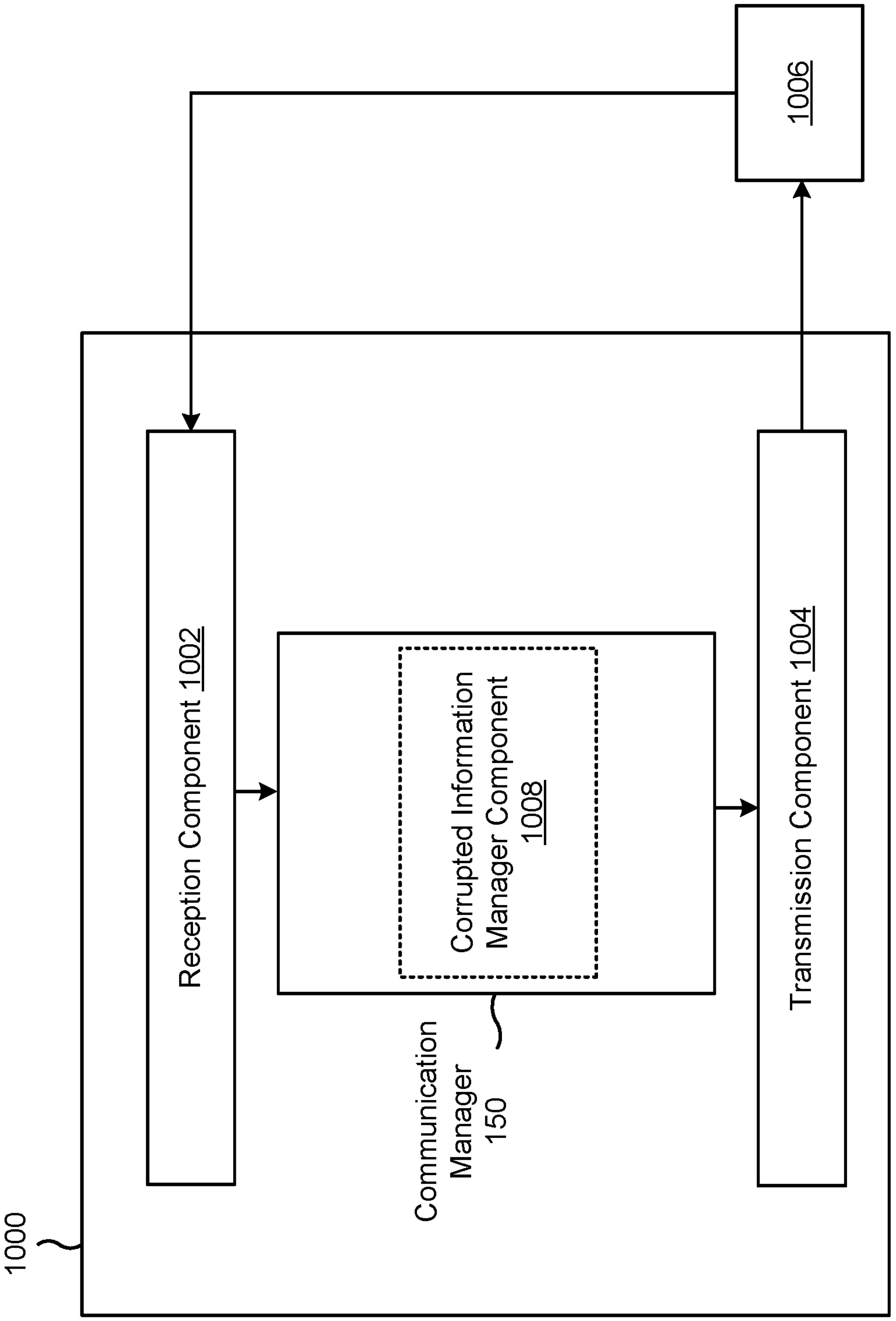
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a corrupted information manager component 1008, among other examples.

In some aspects, the apparatus 1000 may be configured to perform one or more operations described herein in connection with FIGS. 5A-8. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit a corruption configuration indication that specifies a corruption parameter associated with generating controlled corrupted information. The reception component 1002 may receive the controlled corrupted information that is based at least in part on the corruption parameter.

The corrupted information manager component 1008 may train a detection algorithm to detect additional corrupted information based at least in part on the controlled corrupted information.

The corrupted information manager component 1008 may refrain from inputting the additional corrupted information to a network management algorithm based at least in part on the detection algorithm indicating that the additional corrupted information is corrupted.

The corrupted information manager component 1008 may select the measurement type based at least in part on a particular machine learning model.

The corrupted information manager component 1008 may receive, by way of the reception component 1002, UE capability information that indicates that a UE includes an ability to generate the controlled corrupted information.

The corrupted information manager component 1008 may forward the controlled corrupted information to a second network node.

The corrupted information manager component 1008 may apply a trust score to the controlled corrupted information.

The corrupted information manager component 1008 may forward the trust score with the controlled corrupted information to the second network node.

The corrupted information manager component 1008 may generate the trust score based at least in part on a performance of a detection algorithm in processing the controlled corrupted information.

The corrupted information manager component 1008 may train a detection algorithm to detect additional corrupted information based at least in part on the controlled corrupted information.

The corrupted information manager component 1008 may forward, based at least in part on federated learning, an update to the detection algorithm to a core network.

The corrupted information manager component 1008 may receive, by way of the reception component 1002 and from a second network node, additional controlled corrupted information.

The corrupted information manager component 1008 may train a detection algorithm based at least in part on the controlled corrupted information and the additional controlled corrupted information.

The corrupted information manager component 1008 may receive, by way of the reception component 1002, additional information.

The corrupted information manager component 1008 may generate a distribution similarity metric based at least in part on a first distribution associated with the controlled corrupted information and a second distribution associated with the additional information.

The corrupted information manager component 1008 may determine whether the additional information is corrupted based at least in part on the distribution similarity metric.

The corrupted information manager component 1008 may calculate the divergence based at least in part on Kullback-Leibler divergence.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
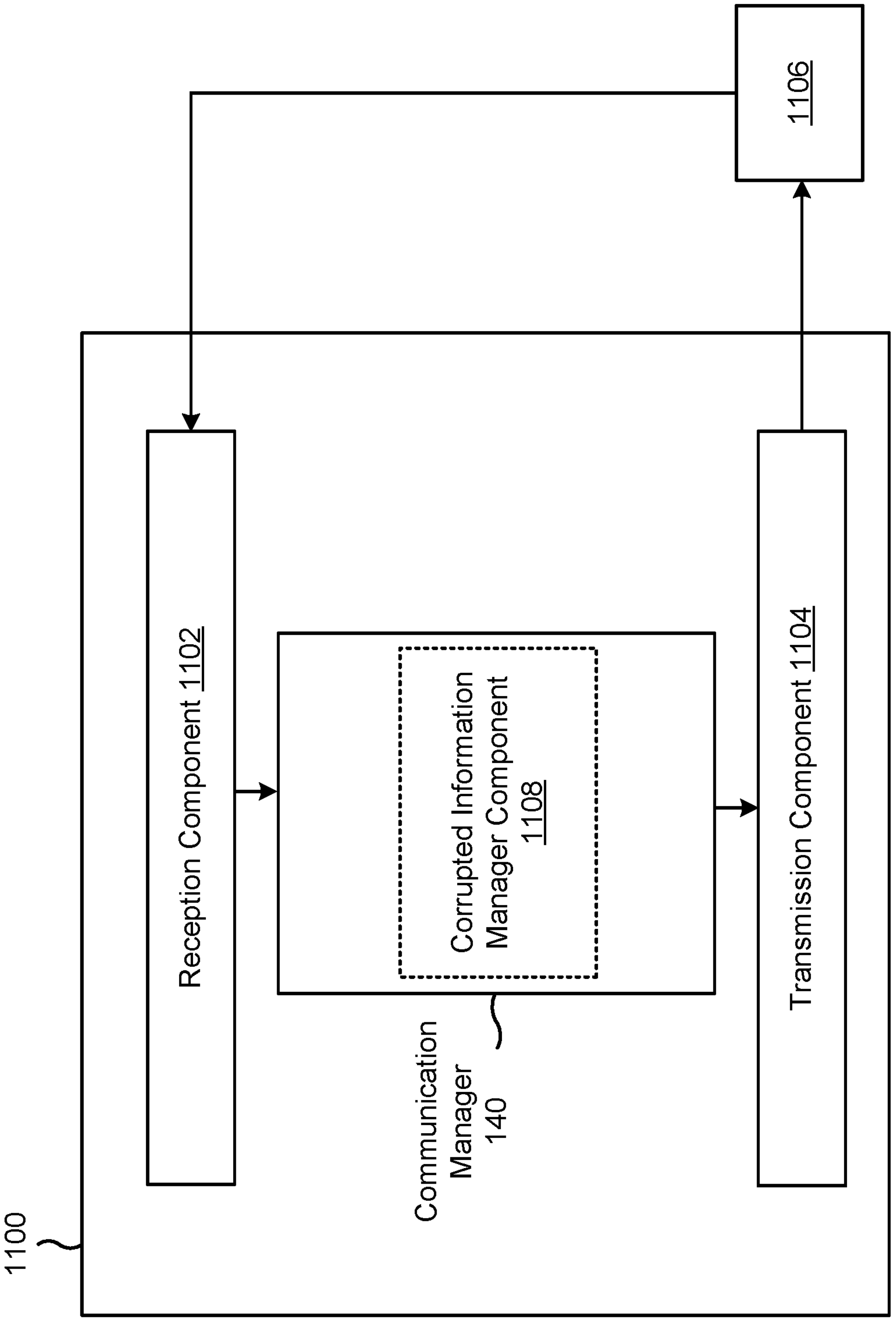
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a corrupted information manager component 1108, among other examples.

In some aspects, the apparatus 1100 may be configured to perform one or more operations described herein in connection with FIGS. 5A-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The corrupted information manager component 1108 may receive, by way of the reception component 1102, a corruption configuration indication that specifies a corruption parameter associated with generating controlled corrupted information. The corrupted information manager component 1108 may transmit, by way of the transmission component 1104, the controlled corrupted information that is based at least in part on the corruption parameter.

The corrupted information manager component 1108 may generate, as the controlled corrupted information, the corrupted measurement result.

The corrupted information manager component 1108 may generate, as the controlled corrupted information, the corrupted data.

The transmission component 1104 may transmit UE capability information that indicates that the UE includes an ability to generate the controlled corrupted information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: transmitting a corruption configuration indication that specifies a corruption parameter associated with generating controlled corrupted information; and receiving the controlled corrupted information that is based at least in part on the corruption parameter.

Aspect 2: The method of Aspect 1, further comprising: training a detection algorithm to detect additional corrupted information based at least in part on the controlled corrupted information.

Aspect 3: The method of Aspect 2, further comprising: refraining from inputting the additional corrupted information to a network management algorithm based at least in part on the detection algorithm indicating that the additional corrupted information is corrupted.

Aspect 4: The method of any of Aspects 1-3, wherein the corruption parameter comprises at least one of: a noise corruption parameter, a bias corruption parameter, or a label corruption parameter.

Aspect 5: The method of any of Aspects 1-4, wherein the corruption parameter indicates a corruption distribution type associated with generating the controlled corrupted information.

Aspect 6: The method of Aspect 5, wherein the corruption parameter indicates at least one of: a distribution type associated with the corruption distribution type, a mean associated with the corruption distribution type, or a variance associated with the corruption distribution type.

Aspect 7: The method of Aspect 6, wherein the corruption distribution type comprises: a Gaussian distribution type, a uniform distribution type, or an exponential distribution type.

Aspect 8: The method of any of Aspects 1-7, wherein the controlled corrupted information comprises a corrupted measurement result, and wherein the corruption configuration indication specifies a measurement type associated with the corrupted measurement result.

Aspect 9: The method of Aspect 8, wherein the measurement type indicates at least one of: a channel measurement type, an interference measurement type, or a beam measurement type.

Aspect 10: The method of Aspect 9, wherein the measurement type indicates at least one of: a Layer 1 channel state information measurement, a Layer 1 signal-to-interference-plus-noise ratio measurement, a Layer 1 reference signal received power measurement, or a Layer 1 reference signal received quality measurement.

Aspect 11: The method of Aspect 8, wherein the measurement type indicates a positioning measurement.

Aspect 12: The method of Aspect 11, wherein the positioning measurement comprises a reference signal time difference measurement.

Aspect 13: The method of Aspect 8, further comprising: selecting the measurement type based at least in part on a particular machine learning model.

Aspect 14: The method of any of Aspects 1-13, wherein the controlled corrupted information comprises corrupted data, and wherein the corruption configuration indication indicates a data type associated with the corrupted data.

Aspect 15: The method of Aspect 14, wherein the data type comprises a gradient update associated with federated learning.

Aspect 16: The method of Aspect 14, wherein the data type comprises a radio frequency compliance data type that is associated with an uplink transmission.

Aspect 17: The method of Aspect 16, wherein the uplink transmission comprises a sounding reference signal transmission.

Aspect 18: The method of Aspect 16, wherein the radio frequency compliance data type comprises at least one of: an error vector magnitude (EVM) radio frequency compliance data type, or an adjacent channel leakage ratio (ACLR) radio frequency compliance data type.

Aspect 19: The method of Aspect 14, wherein the data type comprises an uplink payload.

Aspect 20: The method of Aspect 19, wherein the uplink payload comprises at least one of: a physical uplink control channel (PUCCH) payload, or a physical uplink shared channel (PUSCH) payload.

Aspect 21: The method of any of Aspects 1-20, wherein the corruption configuration indication specifies a condition associated with generating the controlled corrupted information.

Aspect 22: The method of Aspect 21, wherein the condition comprises at least one of: a particular beam occurrence, a transmission configuration indicator state occurrence, a modulation and coding scheme occurrence, a rank occurrence, or a measurement result satisfying a threshold.

Aspect 23: The method of any of Aspects 1-22, further comprising: receiving user equipment (UE) capability information that indicates a UE includes an ability to generate the controlled corrupted information, wherein transmitting the corruption configuration indication comprises: transmitting the corruption configuration indication to the UE based at least in part on receiving the UE capability information. wherein transmitting the corruption configuration indication comprises: transmitting the corruption configuration indication to the UE based at least in part on receiving the UE capability information.

Aspect 24: The method of Aspect 23, wherein the UE capability information indicates a corruption distribution type supported by the UE, and wherein transmitting the corruption configuration indication comprises: transmitting the corruption configuration indication to the UE based at least in part on the corruption distribution type supported by the UE.

Aspect 25: The method of any of Aspects 1-24, further comprising: forwarding the controlled corrupted information to a second network node.

Aspect 26: The method of Aspect 25, further comprising: applying a trust score to the controlled corrupted information; and forwarding the trust score with the controlled corrupted information to the second network node.

Aspect 27: The method of Aspect 26, further comprising: generating the trust score based at least in part on a performance of a detection algorithm in processing the controlled corrupted information.

Aspect 28: The method of Aspect 27, wherein the performance of the detection algorithm is based at least in part on a reject on negative impact defense.

Aspect 29: The method of Aspect 25, wherein the second network node is a core network node, and the method further comprises: receiving, from the core network node, an update to a detection algorithm that is configured to detect corrupted information, and updating the detection algorithm based at least in part on the update.

Aspect 30: The method of any of Aspects 1-29, further comprising: training a detection algorithm to detect additional corrupted information based at least in part on the controlled corrupted information; and forwarding, based at least in part on federated learning, an update to the detection algorithm to a core network.

Aspect 31: The method of any of Aspects 1-30, further comprising: receiving, from a second network node, additional controlled corrupted information; and training a detection algorithm based at least in part on the controlled corrupted information and the additional controlled corrupted information.

Aspect 32: The method of Aspect 31, wherein the second network node is a core network node.

Aspect 33: The method of any of Aspects 1-32, further comprising: receiving additional information; generating a distribution similarity metric based at least in part on a first distribution associated with the controlled corrupted information and a second distribution associated with the additional information; and determining whether the additional information is corrupted based at least in part on the distribution similarity metric.

Aspect 34: The method of Aspect 33, wherein generating the distribution similarity metric is based at least in part on: a first distribution statistical property that is associated with the controlled corrupted information, and a second distribution statistical property that is associated with the additional information.

Aspect 35: The method of Aspect 33, wherein generating the distribution similarity metric is based at least in part on a combination of: at least two distribution statistical properties that are associated with the controlled corrupted information, and at least two distribution statistical properties associated with the additional information.

Aspect 36: The method of Aspect 33, wherein generating the distribution similarity metric is based at least in part on a divergence between the first distribution associated with the controlled corrupted information and the second distribution associated with the additional information.

Aspect 37: The method of Aspect 36, further comprising: calculating the divergence based at least in part on Kullback-Leibler divergence.

Aspect 38: The method of Aspect 33, wherein generating the distribution similarity metric comprises: calculating a distribution distance between the additional information and the controlled corrupted information.

Aspect 39: The method of Aspect 38, wherein calculating the distribution distance is based at least in part on calculating at least one of: a Kolmogorov-Smirnov distance, or an earth-movers distance.

Aspect 40: A method of wireless communication performed by a user equipment (UE), comprising: receiving a corruption configuration indication that specifies a corruption parameter associated with generating controlled corrupted information; and transmitting the controlled corrupted information that is based at least in part on the corruption parameter.

Aspect 41: The method of Aspect 40, wherein the corruption parameter comprises at least one of: a noise corruption parameter, a bias corruption parameter, or a label corruption parameter.

Aspect 42: The method of any of Aspects 40-41, wherein the corruption parameter indicates a corruption distribution type associated with generating the controlled corrupted information.

Aspect 43: The method of Aspect 42, wherein the corruption parameter indicates at least one of: a distribution type associated with the corruption distribution type, a mean associated with the corruption distribution type, or a variance associated with the corruption distribution type.

Aspect 44: The method of Aspect 43, wherein the corruption distribution type comprises: a Gaussian distribution type, a uniform distribution type, or an exponential distribution type.

Aspect 45: The method of any of Aspects 40-44, wherein the controlled corrupted information comprises a corrupted measurement result, and wherein the corruption configuration indication specifies a measurement type associated with the corrupted measurement result.

Aspect 46: The method of Aspect 45, further comprises: generating, as the controlled corrupted information, the corrupted measurement result.

Aspect 47: The method of Aspect 45, wherein the measurement type indicates at least one of: a channel measurement type, an interference measurement type, or a beam measurement type.

Aspect 48: The method of Aspect 47, wherein the measurement type indicates at least one of: a Layer 1 channel state information measurement, a Layer 1 signal-to-interference-plus-noise ratio measurement, a Layer 1 reference signal received power measurement, or a Layer 1 reference signal received quality measurement.

Aspect 49: The method of Aspect 45, wherein the measurement type indicates a positioning measurement.

Aspect 50: The method of Aspect 49, wherein the positioning measurement comprises a reference signal time difference measurement.

Aspect 51: The method of any of Aspects 40-50, wherein the controlled corrupted information comprises corrupted data, and wherein the corruption configuration indication indicates a data type associated with the corrupted data.

Aspect 52: The method of Aspect 51, further comprising: generating, as the controlled corrupted information, the corrupted data.

Aspect 53: The method of Aspect 51, wherein the data type comprises a gradient update associated with federated learning.

Aspect 54: The method of Aspect 51, wherein the data type comprises a radio frequency compliance data type that is associated with an uplink transmission.

Aspect 55: The method of Aspect 54, wherein the uplink transmission comprises a sounding reference signal transmission.

Aspect 56: The method of Aspect 54, wherein the radio frequency compliance data type comprises at least one of: an error vector magnitude (EVM) radio frequency compliance data type, or an adjacent channel leakage ratio (ACLR) radio frequency compliance data type.

Aspect 57: The method of Aspect 51, wherein the data type comprises an uplink payload.

Aspect 58: The method of Aspect 57, wherein the uplink payload comprises at least one of: a physical uplink control channel (PUCCH) payload, or a physical uplink shared channel (PUSCH) payload.

Aspect 59: The method of any of Aspects 40-58, wherein the corruption configuration indication specifies a condition associated with generating the controlled corrupted information.

Aspect 60: The method of Aspect 59, wherein the condition comprises at least one of: a particular beam occurrence, a transmission configuration indicator state occurrence, a modulation and coding scheme occurrence, a rank occurrence, or a measurement result satisfying a threshold.

Aspect 61: The method of any of Aspects 40-60, further comprising: transmitting UE capability information that indicates that the UE includes an ability to generate the controlled corrupted information, wherein receiving the corruption configuration indication comprises: receiving the corruption configuration indication to the UE based at least in part on transmitting the UE capability information. wherein receiving the corruption configuration indication comprises: receiving the corruption configuration indication to the UE based at least in part on transmitting the UE capability information.

Aspect 62: The method of Aspect 61, wherein the UE capability information indicates a corruption distribution type supported by the UE, and wherein receiving the corruption configuration indication comprises: receiving the corruption configuration indication to the UE based at least in part on the corruption distribution type supported by the UE.

Aspect 63: An apparatus for wireless communication at a device, comprising a processor; memory coupled with the processor; and instructions stored in the memory and executable by the processor to cause the apparatus to perform the method of one or more of Aspects 1-39.

Aspect 64: An apparatus for wireless communication at a device, comprising a processor; memory coupled with the processor; and instructions stored in the memory and executable by the processor to cause the apparatus to perform the method of one or more of Aspects 40-62.

Aspect 65: A device for wireless communication, comprising a memory and one or more processors coupled to the memory, the one or more processors configured to perform the method of one or more of Aspects 1-39.

Aspect 66: A device for wireless communication, comprising a memory and one or more processors coupled to the memory, the one or more processors configured to perform the method of one or more of Aspects 40-62.

Aspect 67: An apparatus for wireless communication, comprising at least one means for performing the method of one or more of Aspects 1-39.

Aspect 68: An apparatus for wireless communication, comprising at least one means for performing the method of one or more of Aspects 40-62.

Aspect 69: A non-transitory computer-readable medium storing code for wireless communication, the code comprising instructions executable by a processor to perform the method of one or more of Aspects 1-39.

Aspect 70: A non-transitory computer-readable medium storing code for wireless communication, the code comprising instructions executable by a processor to perform the method of one or more of Aspects 40-62.

Aspect 71: A non-transitory computer-readable medium storing a set of instructions for wireless communication, the set of instructions comprising one or more instructions that, when executed by one or more processors of a device, cause the device to perform the method of one or more of Aspects 1-39.

Aspect 72: A non-transitory computer-readable medium storing a set of instructions for wireless communication, the set of instructions comprising one or more instructions that, when executed by one or more processors of a device, cause the device to perform the method of one or more of Aspects 40-62.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:

one or more memories; and one or more processors, coupled to the one or more memories, which are configured, individually or in any combination, to:

receive, from a user equipment (UE), a capability message that indicates a capability of the UE to generate corrupted data;

transmit, to the UE, a corruption configuration indication that specifies a corruption parameter associated with generating controlled corrupted information, wherein the controlled corrupted information comprises the corrupted data;

receive, from the UE, the controlled corrupted information that is based at least in part on the corruption parameter, wherein a detection algorithm is trained to identify uncontrolled corrupted information based at least in part on the controlled corruption information; and receive, from the UE, a measurement result to be input to the detection algorithm, wherein a distribution similarity metric generated by the detection algorithm indicates whether the measurement result is corrupted.

2. The apparatus of claim 1, wherein the corruption parameter comprises at least one of:

a noise corruption parameter, a bias corruption parameter, or a label corruption parameter.

3. The apparatus of claim 1, wherein the corruption parameter indicates a corruption distribution type associated with generating the controlled corrupted information.

4. The apparatus of claim 1, wherein the corruption configuration indication specifies a measurement type associated with the measurement result, and wherein the measurement result is corrupted.

5. The apparatus of claim 1, wherein the corruption configuration indication indicates a data type associated with the corrupted data.

6. The apparatus of claim 5, wherein the data type comprises a radio frequency compliance data type that is associated with an uplink transmission.

7. The apparatus of claim 5, wherein the data type comprises an uplink payload.

8. The apparatus of claim 1, wherein the corruption configuration indication specifies a condition associated with generating the controlled corrupted information.

9. The apparatus of claim 1, wherein the one or more processors, to transmit the corruption configuration indication, are configured to:

transmit the corruption configuration indication to the UE based at least in part on receiving the capability message.

10. The apparatus of claim 1, wherein the one or more processors are further configured to:

forward the controlled corrupted information to a second network node.

11. The apparatus of claim 1, wherein the one or more processors are further configured to:

generate the distribution similarity metric based at least in part on a first distribution associated with the controlled corrupted information and a second distribution associated with the measurement result, wherein the measurement result comprises an interference power measurement result associated with one or more air interface resources, and wherein the detection algorithm outputs a prediction of an interference power measurement result associated with a future air interface resource.

12. The apparatus of claim 1, wherein the detection algorithm comprises a detection machine learning model.

13. The apparatus of claim 1, wherein the apparatus is instructed to corrupt information based at least in part on a specific behavior.

14. The apparatus of claim 1, wherein the controlled corrupted information comprises an incorrect beam identifier.

15. An apparatus for wireless communication at a user equipment (UE), comprising:

one or more memories; and one or more processors, coupled to the one or more memories, which are configured, individually or in any combination, to:

transmit a capability message that indicates a capability of the UE to generate corrupted data;

receive a corruption configuration indication that specifies a corruption parameter associated with generating controlled corrupted information, wherein the controlled corrupted information comprises the corrupted data;

transmit the controlled corrupted information that is based at least in part on the corruption parameter, wherein a detection algorithm is trained to identify uncontrolled corrupted information based at least in part on the controlled corrupted information; and transmit a measurement result to be input to the detection algorithm, wherein a distribution similarity metric generated by the detection algorithm indicates whether the measurement result is corrupted.

16. The apparatus of claim 15, wherein the corruption parameter indicates a corruption distribution type associated with generating the controlled corrupted information.

17. The apparatus of claim 15, wherein the corruption configuration indication specifies a measurement type associated with the measurement result, and wherein the measurement result is corrupted.

18. The apparatus of claim 15, wherein the one or more processors are further configured to:

generate the measurement result.

19. The apparatus of claim 15, wherein the corruption configuration indication indicates a data type associated with the corrupted data.

20. The apparatus of claim 19, wherein the one or more processors are further configured to:

generate, as the controlled corrupted information, the corrupted data.

21. The apparatus of claim 15, wherein the corruption configuration indication specifies a condition associated with generating the controlled corrupted information.

22. The apparatus of claim 21, wherein the condition comprises at least one of:

a particular beam occurrence, a transmission configuration indicator state occurrence, a modulation and coding scheme occurrence, a rank occurrence, or the measurement result, wherein the measurement result satisfies a threshold.

23. The apparatus of claim 15, wherein the one or more processors, to receive the corruption configuration indication, are configured to:

receive the corruption configuration indication based at least in part on transmitting the capability message.

24. A method of wireless communication performed by a network node, comprising:

receiving, from a user equipment (UE), a capability message that indicates a capability of the UE to generate corrupted data;

transmitting, to the UE, a corruption configuration indication that specifies a corruption parameter associated with generating controlled corrupted information, wherein the controlled corrupted information comprises the corrupted data;

receiving, from the UE, the controlled corrupted information that is based at least in part on the corruption parameter, wherein a detection algorithm is trained to identify uncontrolled corrupted information based at least in part on the controlled corruption information; and receiving, from the UE, a measurement result to be input to the detection algorithm, wherein a distribution similarity metric generated by the detection algorithm indicates whether the measurement result is corrupted.

25. The method of claim 24, further comprising:

forwarding the controlled corrupted information to a second network node.

26. The method of claim 25, further comprising:

applying a trust score to the controlled corrupted information; and forwarding the trust score with the controlled corrupted information to the second network node.

27. The method of claim 24, further comprising:

generating the distribution similarity metric based at least in part on a first distribution associated with the controlled corrupted information and a second distribution associated with the measurement result, wherein the measurement result comprises an interference power measurement result associated with one or more air interface resources, and wherein the detection algorithm outputs a prediction of an interference power measurement result associated with a future air interface resource.

28. The method of claim 27, wherein generating the distribution similarity metric is based at least in part on a divergence between the first distribution and the second distribution.

29. A method of wireless communication performed by a user equipment (UE), comprising:

transmitting a capability message that indicates a capability of the UE to generate corrupted data;

receiving a corruption configuration indication that specifies a corruption parameter associated with generating controlled corrupted information, wherein the controlled corrupted information comprises the corrupted data;

transmitting the controlled corrupted information that is based at least in part on the corruption parameter, wherein a detection algorithm is trained to identify uncontrolled corrupted information based at least in part on the controlled corruption information; and transmitting a measurement result to be input to the detection algorithm, wherein a distribution similarity metric generated by the detection algorithm indicates whether the measurement result is corrupted.

30. The method of claim 29, wherein the corruption parameter indicates a corruption distribution type associated with generating the controlled corrupted information.

* * * * *